United States Patent
Karov Zangvil et al.

(10) Patent No.: US 9,015,036 B2
(45) Date of Patent: Apr. 21, 2015

(54) AUTOMATIC CONTEXT SENSITIVE LANGUAGE CORRECTION USING AN INTERNET CORPUS PARTICULARLY FOR SMALL KEYBOARD DEVICES

(75) Inventors: Yael Karov Zangvil, Tel Aviv (IL); Avner Zangvil, Tel Aviv (IL)

(73) Assignee: Ginger Software, Inc., Lexington, MA (US)

( * ) Notice: Subject to any disclaimer, the term of this patent is extended or adjusted under 35 U.S.C. 154(b) by 236 days.

(21) Appl. No.: 13/576,330

(22) PCT Filed: Jan. 26, 2011

(86) PCT No.: PCT/IL2011/000088
§ 371 (c)(1),
(2), (4) Date: Sep. 19, 2012

(87) PCT Pub. No.: WO2011/092691
PCT Pub. Date: Aug. 4, 2011

(65) Prior Publication Data
US 2013/0006613 A1   Jan. 3, 2013

Related U.S. Application Data

(60) Provisional application No. 61/300,081, filed on Feb. 1, 2010.

(51) Int. Cl.
*G06F 17/27* (2006.01)
*G06F 3/048* (2013.01)
*G06F 3/023* (2006.01)

(52) U.S. Cl.
CPC ............ *G06F 17/276* (2013.01); *G06F 3/0237* (2013.01)

(58) Field of Classification Search
CPC ...................................................... G06F 17/273
See application file for complete search history.

(56) References Cited

U.S. PATENT DOCUMENTS

| | | | |
|---|---|---|---|
| 4,674,065 A | 6/1987 | Lange et al. | |
| 5,146,405 A | 9/1992 | Church et al. | |
| 5,369,577 A | 11/1994 | Kadashevich et al. | |
| 5,485,372 A | 1/1996 | Golding | |
| 5,617,488 A | 4/1997 | Hong et al. | |
| 5,659,771 A | 8/1997 | Golding | |
| 5,752,227 A * | 5/1998 | Lyberg | 704/235 |
| 5,822,728 A | 10/1998 | Applebaum et al. | |

(Continued)

FOREIGN PATENT DOCUMENTS

| JP | 7-78165 A | 3/1995 |
|---|---|---|
| WO | 2006/086053 | 8/2006 |

(Continued)

OTHER PUBLICATIONS

An English Translation of an Office Action dated Jan. 25, 2013, which issued during the prosecution of Chinese Patent Application No. 200880101405.7.

(Continued)

*Primary Examiner* — Brian Albertalli
(74) *Attorney, Agent, or Firm* — Sughrue Mion, PLLC

(57) ABSTRACT

A computer-assisted language correction system particularly suitable for use with small keyboard devices including spelling correction functionality, misused word correction functionality and grammar correction functionality utilizing contextual feature-sequence functionality employing an interne corpus.

15 Claims, 11 Drawing Sheets

(56) References Cited

U.S. PATENT DOCUMENTS

| | | | |
|---|---|---|---|
| 5,828,991 A | 10/1998 | Skiena et al. | |
| 5,899,973 A | 5/1999 | Bandara et al. | |
| 5,907,839 A | 5/1999 | Roth | |
| 5,956,739 A | 9/1999 | Golding et al. | |
| 6,006,221 A | 12/1999 | Liddy et al. | |
| 6,085,206 A * | 7/2000 | Domini et al. | 715/257 |
| 6,098,034 A | 8/2000 | Razin et al. | |
| 6,154,722 A | 11/2000 | Bellegarda | |
| 6,173,261 B1 | 1/2001 | Arai et al. | |
| 6,272,242 B1 | 8/2001 | Saitoh et al. | |
| 6,314,400 B1 | 11/2001 | Klakow | |
| 6,366,759 B1 | 4/2002 | Burstein et al. | |
| 6,424,983 B1 | 7/2002 | Schabes et al. | |
| 6,456,972 B1 | 9/2002 | Gladstein et al. | |
| 6,751,584 B2 | 6/2004 | Bangalore | |
| 7,020,338 B1 | 3/2006 | Cumbee | |
| 7,030,863 B2 | 4/2006 | Longe et al. | |
| 7,092,567 B2 | 8/2006 | Ma et al. | |
| 7,117,144 B2 | 10/2006 | Goodman et al. | |
| 7,165,019 B1 | 1/2007 | Lee et al. | |
| 7,224,346 B2 | 5/2007 | Sheng | |
| 7,277,088 B2 | 10/2007 | Robinson et al. | |
| 7,295,965 B2 | 11/2007 | Haigh et al. | |
| 7,295,968 B2 | 11/2007 | Bietrix | |
| 7,296,019 B1 | 11/2007 | Chandrasekar et al. | |
| 7,340,388 B2 | 3/2008 | Soricut | |
| 7,386,442 B2 | 6/2008 | Dehlinger et al. | |
| 7,457,808 B2 | 11/2008 | Gaussier | |
| 7,558,725 B2 | 7/2009 | Greenwald et al. | |
| 7,584,093 B2 | 9/2009 | Potter et al. | |
| 7,590,626 B2 | 9/2009 | Li et al. | |
| 7,647,554 B2 | 1/2010 | Pickover et al. | |
| 7,813,916 B2 | 10/2010 | Bean | |
| 7,917,355 B2 | 3/2011 | Wu et al. | |
| 7,957,955 B2 | 6/2011 | Christie et al. | |
| 8,176,419 B2 | 5/2012 | Zhu et al. | |
| 8,219,905 B2 | 7/2012 | Akrout et al. | |
| 8,232,973 B2 | 7/2012 | Kocienda et al. | |
| 8,321,786 B2 | 11/2012 | Lunati | |
| 8,341,520 B2 * | 12/2012 | Iakobashvili et al. | 715/257 |
| 8,365,070 B2 * | 1/2013 | Song et al. | 715/257 |
| 8,473,278 B2 | 6/2013 | Futagi et al. | |
| 8,543,384 B2 | 9/2013 | Kristensson et al. | |
| 8,626,486 B2 | 1/2014 | Och et al. | |
| 8,626,786 B2 * | 1/2014 | Halcrow et al. | 707/765 |
| 8,645,124 B2 | 2/2014 | Karov Zangvil | |
| 2002/0032564 A1 | 3/2002 | Ehsani et al. | |
| 2002/0128821 A1 | 9/2002 | Ehsani | |
| 2002/0169595 A1 | 11/2002 | Agichtein et al. | |
| 2003/0204569 A1 | 10/2003 | Andrews et al. | |
| 2003/0210249 A1 * | 11/2003 | Simske | 345/581 |
| 2003/0233222 A1 | 12/2003 | Soricut et al. | |
| 2004/0002849 A1 | 1/2004 | Zhou | |
| 2004/0030540 A1 | 2/2004 | Ovil et al. | |
| 2004/0093567 A1 | 5/2004 | Schabes et al. | |
| 2004/0138869 A1 | 7/2004 | Heinecke | |
| 2004/0260543 A1 | 12/2004 | Horowitz | |
| 2005/0043940 A1 | 2/2005 | Elder | |
| 2005/0044495 A1 | 2/2005 | Lee et al. | |
| 2005/0053900 A1 | 3/2005 | Kaufmann | |
| 2005/0091030 A1 | 4/2005 | Jessee et al. | |
| 2005/0108001 A1 | 5/2005 | Aarskog | |
| 2005/0120002 A1 | 6/2005 | Behbehani | |
| 2005/0143971 A1 | 6/2005 | Burstein | |
| 2005/0209844 A1 | 9/2005 | Wu et al. | |
| 2005/0257146 A1 | 11/2005 | Ashcraft et al. | |
| 2006/0003297 A1 | 1/2006 | Wiig et al. | |
| 2006/0048055 A1 | 3/2006 | Wu et al. | |
| 2006/0110714 A1 | 5/2006 | Symmes | |
| 2006/0129381 A1 | 6/2006 | Wakita | |
| 2006/0247914 A1 | 11/2006 | Brener et al. | |
| 2007/0073532 A1 | 3/2007 | Brockett et al. | |
| 2007/0094024 A1 | 4/2007 | Kristensson et al. | |
| 2007/0106937 A1 | 5/2007 | Cucerzan et al. | |
| 2007/0141544 A1 | 6/2007 | Nakane | |
| 2007/0238084 A1 | 10/2007 | Maguire et al. | |
| 2007/0265831 A1 | 11/2007 | Dinur et al. | |
| 2007/0271089 A1 | 11/2007 | Bates et al. | |
| 2008/0059151 A1 | 3/2008 | Chen | |
| 2008/0077859 A1 | 3/2008 | Schabes et al. | |
| 2008/0154600 A1 | 6/2008 | Tian et al. | |
| 2008/0167858 A1 | 7/2008 | Christie et al. | |
| 2008/0189106 A1 | 8/2008 | Low et al. | |
| 2008/0195940 A1 | 8/2008 | Gail et al. | |
| 2008/0208567 A1 | 8/2008 | Brockett | |
| 2008/0208582 A1 | 8/2008 | Gallino | |
| 2008/0270897 A1 | 10/2008 | Jawerth et al. | |
| 2009/0083028 A1 | 3/2009 | Davtchev et al. | |
| 2009/0198671 A1 | 8/2009 | Zhang | |
| 2009/0319257 A1 | 12/2009 | Blume et al. | |
| 2010/0050074 A1 * | 2/2010 | Nachmani et al. | 715/257 |
| 2010/0275118 A1 * | 10/2010 | Iakobashvili et al. | 715/257 |
| 2010/0286979 A1 | 11/2010 | Zangvil et al. | |
| 2011/0093268 A1 | 4/2011 | Gorin et al. | |
| 2011/0184720 A1 | 7/2011 | Karov Zangvil | |
| 2013/0024185 A1 | 1/2013 | Parikh | |
| 2013/0138641 A1 | 5/2013 | Korolev et al. | |

FOREIGN PATENT DOCUMENTS

| | | |
|---|---|---|
| WO | 2007/049792 | 5/2007 |
| WO | 2009/016631 | 2/2009 |
| WO | 2009/144701 | 12/2009 |
| WO | 2010/013228 | 2/2010 |
| WO | 2011/092691 | 8/2011 |

OTHER PUBLICATIONS

An Office Action dated Feb. 5, 2013, which issued during the prosecution of U.S. Appl. No. 12/669,175.

An Office Action dated Mar. 7, 2014, which issued during the prosecution of U.S. Appl. No. 12/669,175.

An Office Action dated Aug. 5, 2013, which issued during the prosecution of U.S. Appl. No. 12/669,175.

An Office Action together with the English translation dated Sep. 3, 2013 which issued during the prosecution of Japanese Patent Application No. 520650/2011.

Notice of Allowance dated Oct. 1, 2013, which issued during the prosecution of U.S. Appl. No. 13/056,563.

Bick, E., "A Constraint Grammar Based Spellchecker for Danish with a Special Focus on Dyslexics" SKY Journal of Linguistics, vol. 19:2006 (ISSN 1796-279X), pp. 387-396 (retrieved Jan. 12, 2009 from the internet). <URL:http://www.ling.helsinki.fi/sky/julkaisut/SKY2006_1/1.6.1.%20BICK.pdf>.

An International Search Report dated Feb. 3, 2009 which issued during the prosecution of Applicant's PCT/IL08/01051.

U.S. Appl. No. 61/300,081, filed Feb. 1, 2010.

An International Search Report and a Written Opinion both dated May 25, 2011 which issued during the prosecution of Applicant's PCT/IL11/00088.

An International Preliminary Report on Patentability dated Aug. 7, 2012, which issued during the prosecution of Applicant's PCT/IL2011/000088.

An English Translation of an Office Action dated Apr. 28, 2012 which issued during the prosecution of Chinese Patent Application No. 200880101405.7.

An International Preliminary Examination Report dated Oct. 19, 2010 which issued during the prosecution of Applicant's PCT/IL09/00317.

An International Search Report dated May 11, 2009 which issued during the prosecution of Applicant's PCT/IL09/00130.

An International Search Report dated Jun. 26, 2009 which issued during the prosecution of Applicant's PCT/IL09/00317.

A Supplementary European Search Report dated Jul. 5, 2012, which issued during the prosecution of Applicant's European Application No. 08789727.

(56) References Cited

OTHER PUBLICATIONS

An English Translation of an Office Action dated Jun. 23, 2011 which issued during the prosecution of Chinese Patent Application No. 200880104057.

A Written Opinion dated Feb. 3, 2009, which issued during the prosecution of Applicant's PCT/IL2008/0001051.

An International Preliminary Report on Patentability dated Feb. 2, 2010, which issued during the prosecution of Applicant's PCT/IL2008/0001051.

A Restriction Requirement dated Oct. 12, 2012, which issued during the prosecution of U.S. Appl. No. 12/669,175.

An Office Action dated May 9, 2013, which issued during the prosecution of U.S. Appl. No. 12/937,618.

An Office Action dated Sep. 18, 2014, which issued during the prosecution of U.S. Appl. No. 14/143,827.

An English translation of an Office Action, dated Jun. 3, 2014, issued by the Japanese Patent Office, in counterpart Application No. 2012-550565.

* cited by examiner

AUTOMATIC CONTEXT SENSITIVE LANGUAGE CORRECTION USING AN INTERNET CORPUS PARTICULARLY FOR SMALL KEYBOARD DEVICES

REFERENCE TO RELATED APPLICATIONS

Reference is hereby made to U.S. Provisional Patent Application Ser. No. 61/300,081, filed Feb. 1, 2010, entitled AUTOMATIC CONTEXT SENSITIVE LANGUAGE CORRECTION USING AN INTERNET CORPUS PARTICULARLY FOR SMALL KEYBOARD DEVICES, the disclosure of which is hereby incorporated by reference and priority of which is hereby claimed pursuant to 37 CFR 1.78(a) (4) and (5)(i).

FIELD OF THE INVENTION

The present invention relates to computer-assisted language correction generally.

BACKGROUND OF THE INVENTION

The following publications are believed to represent the current state of the art:

U.S. Pat. Nos. 5,659,771; 5,907,839; 6,424,983; 7,296,019; 5,956,739 and 4,674,065

U.S. Published Patent Application Nos. 2006/0247914 and 2007/0106937;

SUMMARY OF THE INVENTION

The present invention seeks to provide improved systems and functionalities for computer based language correction for small keyboard devices, such as handheld devices, mobile devices, touch screen devices and tablet PC devices.

There is thus provided in accordance with a preferred embodiment of the present invention a language correction system particularly suitable for small keyboard devices, such as handheld devices, mobile devices, touch screen devices and tablet PC devices, the system including an alternatives generator, generating on the basis of an input sentence a text-based representation providing multiple alternatives for each of a plurality of words in the sentence, a selector for selecting among at least the multiple alternatives for each of the plurality of words in the sentence, based at least partly on an interne corpus, and a correction generator operative to provide a correction output based on selections made by the selector.

Preferably, the selector is operative to make the selections based on at least one of the following correction functions: spelling correction, misused word correction and grammar correction.

Additionally or alternatively, the input sentence is provided by one of the following functionalities: short message service (SMS) functionality, E-mail functionality, web search functionality, web page editing box functionality, small keyboard device word processor functionality and speech-to-text conversion functionality, and the selector is operative to make the selections based on at least one of the following correction functions: misused word correction and grammar correction.

Preferably, the correction generator includes a corrected language input generator operative to provide a corrected language output based on selections made by the selector without requiring user intervention. Additionally or alternatively, the grammar correction functionality includes at least one of punctuation, verb inflection, single/plural noun, article and preposition correction functionalities.

In accordance with a preferred embodiment of the present invention the grammar correction functionality includes at least one of replacement, insertion and omission correction functionalities.

Preferably, the selector includes context based scoring functionality operative to rank the multiple alternatives, based at least partially on contextual feature-sequence (CFS) frequencies of occurrences in an internet corpus. Additionally, the context based scoring functionality is also operative to rank the multiple alternatives based at least partially on normalized CFS frequencies of occurrences in the internet corpus.

There is also provided in accordance with another preferred embodiment of the present invention a language correction system particularly suitable for use with small keyboard devices including at least one of spelling correction functionality, misused word correction functionality and grammar correction, and contextual feature-sequence functionality cooperating with at least one of the spelling correction functionality; the misused word correction functionality and the grammar correction and employing an internet corpus.

Preferably, the grammar correction functionality includes at least one of punctuation, verb inflection, single/plural noun, article and preposition correction functionalities. Additionally or alternatively, the grammar correction functionality includes at least one of replacement, insertion and omission correction functionalities.

In accordance with a preferred embodiment of the present invention the language correction system particularly suitable for use with small keyboard devices includes at least one of the spelling correction functionality, the misused word correction functionality and the grammar correction functionality, and the contextual feature-sequence functionality cooperates with at least one of the spelling correction functionality, the misused word correction functionality and the grammar correction functionality, and employs an internet corpus.

Preferably, the language correction system particularly suitable for use with small keyboard devices also includes at least two of the spelling correction functionality, the misused word correction functionality and the grammar correction functionality and the contextual feature-sequence functionality cooperates with at least two of the spelling correction functionality, the misused word correction functionality and the grammar correction functionality, and employs an internet corpus.

In accordance with a preferred embodiment of the present invention the language correction system particularly suitable for use with small keyboard devices also includes the spelling correction functionality, the misused word correction functionality and the grammar correction functionality, and the contextual feature-sequence functionality cooperates with the spelling correction functionality, the misused word correction functionality and the grammar correction functionality, and employs an internet corpus.

Preferably, the correction generator includes a corrected language generator operative to provide a corrected language output based on selections made by the selector without requiring user intervention.

There is further provided in accordance with yet another preferred embodiment of the present invention a computer-assisted language correction system particularly suitable for use with small keyboard devices including an alternatives generator, generating on the basis of a language input a text-based representation providing multiple alternatives for each of a plurality of words in the sentence, a selector for selecting among at least the multiple alternatives for each of the plurality of words in the language input, based at least partly on a relationship between selected ones of the multiple alternatives for at least some of the plurality of words in the language input and a correction generator operative to provide a correction output based on selections made by the selector.

Preferably, the language input includes at least one of an input sentence and an input text. Additionally or alternatively, the language input is speech and the generator converts the language input in speech to a text-based representation providing multiple alternatives for a plurality of words in the language input.

In accordance with a preferred embodiment of the present invention the language input is at least one of a text input and an output of word processing functionality, and the generator converts the language input in text to a text-based representation providing multiple alternatives for a plurality of words in the language input.

Preferably, the selector is operative to make the selections based on at least one of the following correction functions: spelling correction, misused word correction and grammar correction.

In accordance with a preferred embodiment of the present invention the language input is speech and the selector is operative to make the selections based on at least one of the following correction functions: misused word correction, and grammar correction.

Preferably, the selector is operative to make the selections by carrying out at least two of the following functions: selection of a first set of words or combinations of words which include less than all of the plurality of words in the language input for an initial selection, thereafter ordering elements of the first set of words or combinations of words to establish priority of selection and thereafter when selecting among the multiple alternatives for an element of the first set of words, choosing other words, but not all, of the plurality of words as a context to influence the selecting. Additionally or alternatively, the selector is operative to make the selections by carrying out the following function: when selecting for an element having at least two words, evaluating each of the multiple alternatives for each of the at least two words in combination with each of the multiple alternatives for each other of the at least two words.

In accordance with a preferred embodiment of the present invention the correction generator includes a corrected language input generator operative to provide a corrected language output based on selections made by the selector without requiring user intervention.

There is even further provided in accordance with still another preferred embodiment of the present invention a computer-assisted language correction system particularly suitable for use with small keyboard devices including a misused-word suspector evaluating at least most of the words in an language input on the basis of their fit within a context of the language input and a correction generator operative to provide a correction output based at least partially on an evaluation performed by the suspector.

Preferably, the computer-assisted language correction system particularly suitable for use with small keyboard devices also includes an alternatives generator, generating on the basis of the language input, a text-based representation providing multiple alternatives for at least one of the at least most words in the language input and a selector for selecting among at least the multiple alternatives for each of the at least one of the at least most words in the language input, and the correction generator is operative to provide the correction output based on selections made by the selector. Additionally or alternatively, the computer-assisted language correction system particularly suitable for use with small keyboard devices also includes a suspect word output indicator indicating an extent to which at least some of the at least most of the words in the language input is suspect as a misused-word.

In accordance with a preferred embodiment of the present invention the correction generator includes an automatic corrected language generator operative to provide a corrected text output based at least partially on an evaluation performed by the suspector, without requiring user intervention.

Preferably, the language input is speech and the selector is operative to make the selections based on at least one of the following correction functions: misused word correction, and grammar correction.

There is also provided in accordance with still another preferred embodiment of the present invention a computer-assisted language correction system particularly suitable for use with small keyboard devices including a misused-word suspector evaluating words in an language input, an alternatives generator, generating multiple alternatives for at least some of the words in the language input evaluated as suspect words by the suspector, at least one of the multiple alternatives for a word in the language input being consistent with a contextual feature of the word in the language input in an internet corpus, a selector for selecting among at least the multiple alternatives and a correction generator operative to provide a correction output based at least partially on a selection made by the selector.

There is further provided in accordance with yet another preferred embodiment of the present invention a computer-assisted language correction system particularly suitable for use with small keyboard devices including a misused-word suspector evaluating words in an language input and identifying suspect words, an alternatives generator, generating multiple alternatives for the suspect words, a selector, grading each the suspect word as well as ones of the multiple alternatives therefor generated by the alternatives generator according to multiple selection criteria, and applying a bias in favor of the suspect word vis-à-vis ones of the multiple alternatives therefor generated by the alternatives generator and a correction generator operative to provide a correction output based at least partially on a selection made by the selector.

There is yet further provided in accordance with still another preferred embodiment of the present invention a computer-assisted language correction system particularly suitable for use with small keyboard devices including an alternatives generator, generating on the basis of an input multiple alternatives for at least one word in the input, a selector, grading each the at least one word as well as ones of the multiple alternatives therefor generated by the alternatives generator according to multiple selection criteria, and applying a bias in favor of the at least one word vis-à-vis ones of the multiple alternatives therefor generated by the alternatives generator, the bias being a function of an input uncertainty metric indicating uncertainty of a person providing the input, and a correction generator operative to provide a correction output based on a selection made by the selector.

There is even further provided in accordance with another preferred embodiment of the present invention a computer-assisted language correction system particularly suitable for use with small keyboard devices including an incorrect word suspector evaluating at least most of the words in a language input, the suspector being at least partially responsive to an input uncertainty metric indicating uncertainty of a person providing the input, the suspector providing a suspected incorrect word output, and an alternatives generator, generating a plurality of alternatives for suspected incorrect words identified by the suspected incorrect word output, a selector for selecting among each suspected incorrect word and the plurality of alternatives generated by the alternatives generator, and a correction generator operative to provide a correction output based on a selection made by the selector.

There is also provided in accordance with yet another preferred embodiment of the present invention a computer-assisted language correction system particularly suitable for use with small keyboard devices including at least one of a spelling correction module, a misused-word correction module, and a grammar correction module receiving a multi-word input and providing a correction output, each of the at least one of a spelling correction module, a misused-word correction module, and a grammar correction module including an alternative word candidate generator including phonetic similarity functionality operative to propose alternative words based on phonetic similarity to a word in the input and to indicate a metric of phonetic similarity and character string similarity functionality operative to propose alternative words based on character string similarity to a word in the input and to indicate a metric of character string similarity for each alternative word, and a selector operative to select either a word in the output or an alternative word candidate proposed by the alternative word candidate generator by employing the phonetic similarity and character string similarity metrics together with context-based selection functionality.

There is even further provided in accordance with still another preferred embodiment of the present invention a computer-assisted language correction system particularly suitable for use with small keyboard devices including suspect word identification functionality, receiving a multi-word language input and providing a suspect word output which indicates suspect words, feature identification functionality operative to identify features including the suspect words, an alternative selector identifying alternatives to the suspect words, feature occurrence functionality employing a corpus and providing an occurrence output, ranking various features including the alternatives as to their frequency of use in the corpus, and a selector employing the occurrence output to provide a correction output, the feature identification functionality including feature filtration functionality including at least one of functionality for eliminating features containing suspected errors, functionality for negatively biasing features which contain words introduced in an earlier correction iteration of the multi-word input and which have a confidence level below a confidence level predetermined threshold, and functionality for eliminating features which are contained in another feature having an frequency of occurrence above a predetermined frequency threshold.

Preferably, the selector is operative to make the selections based on at least one of the following correction functions: spelling correction, misused word correction, and grammar correction.

In accordance with a preferred embodiment of the present invention the language input is speech and the selector is operative to make the selections based on at least one of the following correction functions: grammar correction and misused word correction.

Preferably, the correction generator includes a corrected language input generator operative to provide a corrected language output based on selections made by the selector without requiring user intervention.

In accordance with a preferred embodiment of the present invention the selector is also operative to make the selections based at least partly on a user input uncertainty metric. Additionally, the user input uncertainty metric is a function based on a measurement of the uncertainty of a person providing the input. Additionally or alternatively, the selector also employs user input history learning functionality.

There is still further provided in accordance with yet another preferred embodiment of the present invention a computer-assisted language correction system particularly suitable for use with small keyboard devices including suspect word identification functionality, receiving a multi-word language input and providing a suspect word output which indicates suspect words, feature identification functionality operative to identify features including the suspect words, an alternative selector identifying alternatives to the suspect words, occurrence functionality employing a corpus and providing an occurrence output, ranking features including the alternatives as to their frequency of use in the corpus, and a correction output generator, employing the occurrence output to provide a correction output, the feature identification functionality including at least one of: N-gram identification functionality and co-occurrence identification functionality, and at least one of: skip-gram identification functionality, switch-gram identification functionality and previously used by user feature identification functionality.

There is yet further provided in accordance with another preferred embodiment of the present invention a computer-assisted language correction system particularly suitable for use with small keyboard devices including a grammatical error suspector evaluating at least most of the words in an language input on the basis of their fit within a context of the language input and a correction generator operative to provide a correction output based at least partially on an evaluation performed by the suspector.

Preferably, the computer-assisted language correction system particularly suitable for use with small keyboard devices also includes an alternatives generator, generating on the basis of the language input, a text-based representation providing multiple alternatives for at least one of the at least most words in the language input, and a selector for selecting among at least the multiple alternatives for each of the at least one of the at least most words in the language input, and the correction generator is operative to provide the correction output based on selections made by the selector.

In accordance with a preferred embodiment of the present invention the computer-assisted language correction system particularly suitable for use with small keyboard devices also includes a suspect word output indicator indicating an extent to which at least some of the at least most of the words in the language input is suspect as containing grammatical error.

Preferably, the correction generator includes an automatic corrected language generator operative to provide a corrected text output based at least partially on an evaluation performed by the suspector, without requiring user intervention.

There is also provided in accordance with still another preferred embodiment of the present invention a computer-assisted language correction system particularly suitable for use with small keyboard devices including a grammatical error suspector evaluating words in an language input, an alternatives generator, generating multiple alternatives for at least some of the words in the language input evaluated as suspect words by the suspector, at least one of the multiple alternatives for a word in the language input being consistent with a contextual feature of the word in the language input, a selector for selecting among at least the multiple alternatives and a correction generator operative to provide a correction output based at least partially on a selection made by the selector.

There is further provided in accordance with yet another preferred embodiment of the present invention a computer-assisted language correction system particularly suitable for use with small keyboard devices including a grammatical error suspector evaluating words in an language input and identifying suspect words, an alternatives generator, generating multiple alternatives for the suspect words, a selector, grading each the suspect word as well as ones of the multiple alternatives therefor generated by the alternatives generator according to multiple selection criteria, and applying a bias in favor of the suspect word vis-à-vis ones of the multiple alternatives therefor generated by the alternatives generator, and a correction generator operative to provide a correction output based at least partially on a selection made by the selector.

Preferably, the correction generator includes a corrected language input generator operative to provide a corrected language output based on selections made by the selector without requiring user intervention.

There is even further provided in accordance with still another preferred embodiment of the present invention a computer-assisted language correction system particularly suitable for use with small keyboard devices including context based scoring of various alternative corrections, based at least partially on contextual feature-sequence (CFS) frequencies of occurrences in an internet corpus.

Preferably, the computer-assisted language correction system particularly suitable for use with small keyboard devices also includes at least one of spelling correction functionality, misused word correction functionality, and grammar correction functionality, cooperating with the context based scoring.

In accordance with a preferred embodiment of the present invention the context based scoring is also based at least partially on normalized CFS frequencies of occurrences in an internet corpus. Additionally or alternatively, the context based scoring is also based at least partially on a CFS importance score. Additionally, the CFS importance score is a function of at least one of the following: operation of a part-of-speech tagging and sentence parsing functionality; a CFS length; a frequency of occurrence of each of the words in the CFS and a CFS type.

There is also provided in accordance with yet another preferred embodiment of the present invention a computer-assisted language correction system particularly suitable for use with small keyboard devices including an alternatives generator, generating on the basis of an input sentence a text-based representation providing multiple alternatives for each of a plurality of words in the sentence, a selector for selecting among at least the multiple alternatives for each of the plurality of words in the sentence, a confidence level assigner operative to assign a confidence level to the selected alternative from said multiple alternatives and a correction generator operative to provide a correction output based on selections made by the selector and at least partially on the confidence level.

Preferably, the multiple alternatives are evaluated based on contextual feature sequences (CFSs) and the confidence level is based on at least one of the following parameters: number, type and scoring of selected CFSs, a measure of statistical significance of frequency of occurrence of the multiple alternatives, in the context of the CFSs, degree of consensus on the selection of one of the multiple alternatives, based on preference metrics of each of the CFSs and word similarity scores of the multiple alternatives, a non-contextual similarity score of the one of the multiple alternatives being above a first predetermined minimum threshold and an extent of contextual data available, as indicated by the number of the CFSs having CFS scores above a second predetermined minimum threshold and having preference scores over a third predetermined threshold.

There is also provided in accordance with yet another preferred embodiment of the present invention a computer-assisted language correction system particularly suitable for use with small keyboard devices including a punctuation error suspector evaluating at least some of the words and punctuation in a language input on the basis of their fit within a context of the language input based on frequency of occurrence of feature-grams of the language input in an internet corpus and a correction generator operative to provide a correction output based at least partially on an evaluation performed by the suspector.

Preferably, the correction generator includes at least one of missing punctuation correction functionality, superfluous punctuation correction functionality and punctuation replacement correction functionality.

There is further provided in accordance with still another preferred embodiment of the present invention a computer-assisted language correction system particularly suitable for use with small keyboard devices including a grammatical element error suspector evaluating at least some of the words in a language input on the basis of their fit within a context of the language input based on frequency of occurrence of feature-grams of the language input in an interne corpus and a correction generator operative to provide a correction output based at least partially on an evaluation performed by the suspector.

Preferably, the correction generator includes at least one of missing grammatical element correction functionality, superfluous grammatical element correction functionality and grammatical element replacement correction functionality. Additionally or alternatively, the grammatical element is one of an article, a preposition and a conjunction.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

It is appreciated that in any keyboard-based input system errors arise from a user incorrectly striking one or more keys located in proximity to a desired key. This is especially true in small keyboard devices, where a user may incorrectly strike another key located in proximity to the desired key, or may strike another key in addition to the desired key. Thus, for example in a QWERTY keyboard, a user intending to press the F key may press in addition one or more of the following keys: R, T, D, G, C, and V. The system and functionality for computer-assisted language correction particularly suitable for use with small keyboard devices of the present invention preferably includes functionality to suggest corrections to a user to remedy these input errors.

Figure 1:
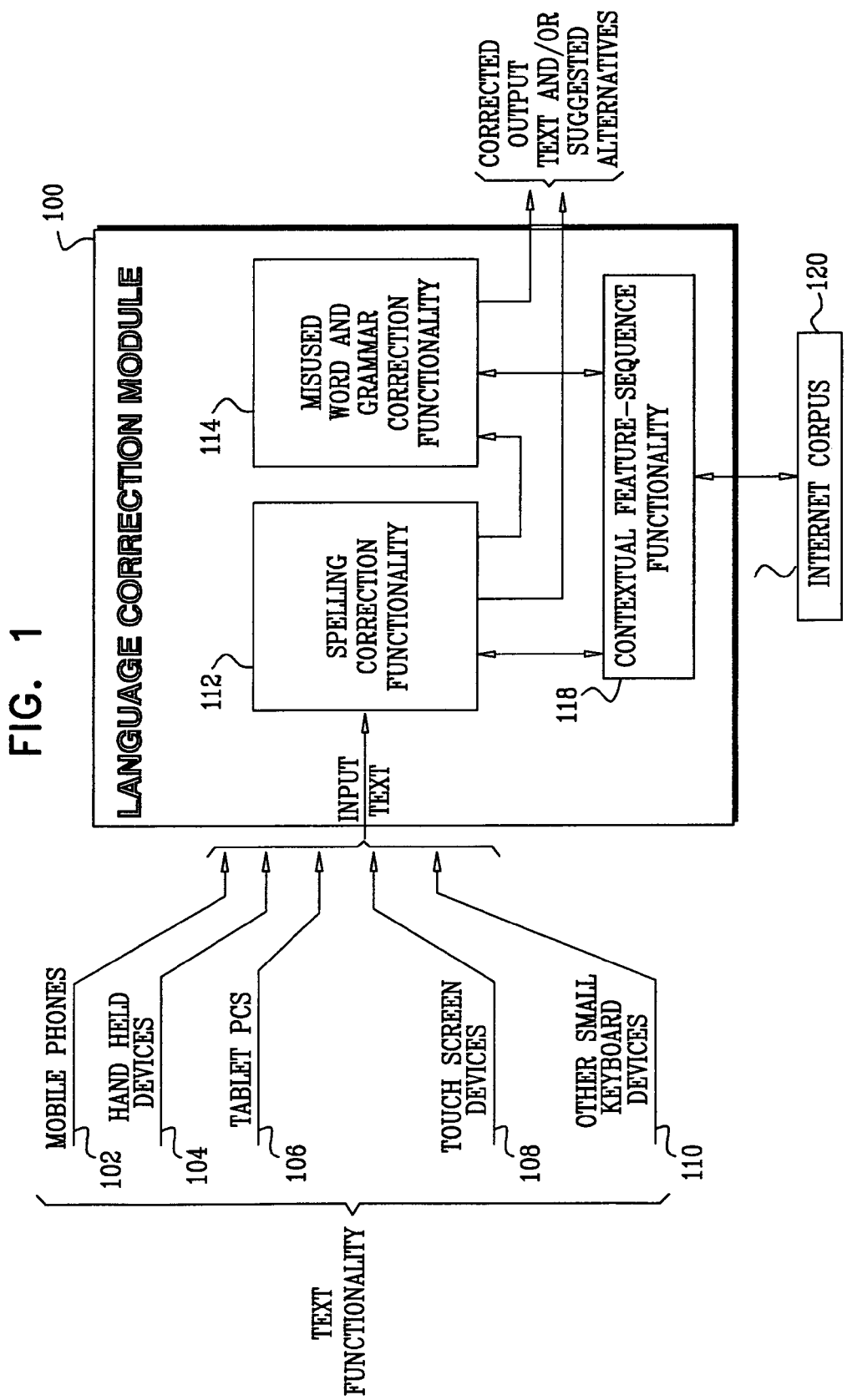
FIG. 1 is a simplified block diagram illustration of a system and functionality for computer-assisted language correction constructed and operative in accordance with a preferred embodiment of the present invention.

Reference is now made to FIG. 1, which is a simplified block diagram illustration of a system and functionality for computer-assisted language correction constructed and operative in accordance with a preferred embodiment of the present invention. As seen in FIG. 1, text for correction is supplied to a language correction module 100 from one or more sources including text functionality, such as, without limitation, mobile phones 102, handheld devices 104, tablet PCs 106, touch screen devices 108 and any other small keyboard device 110.

Language correction module 100 preferably includes spelling correction functionality 112 and misused word and grammar correction functionality 114.

It is a particular feature of the present invention that spelling correction functionality 112 and misused word and grammar correction functionality 114 each interact with contextual-feature-sequence (CFS) functionality 118, which utilizes an internet corpus 120.

A contextual-feature-sequence or CFS is defined for the purposes of the present description as including, N-grams, skip-grams, switch-grams, co-occurrences "previously used by user features" and combinations thereof, which are in turn defined hereinbelow with reference to FIG. 4. It is noted that for simplicity and clarity of description, most of the examples which follow employ n grams only. It is understood that the invention is not so limited.

The use of an internet corpus is important in that it provides significant statistical data for an extremely large number of contextual-feature-sequences, resulting in highly robust language correction functionality. In practice, combinations of over two words have very poor statistics in conventional non-internet corpuses but have acceptable or good statistics in internet corpuses.

An internet corpus is a large representative sample of natural language text which is collected from the world wide web, usually by crawling on the internet and collecting text from website pages. Preferably, dynamic text, such as chat transcripts, texts from web forums and texts from blogs, is also collected. The collected text is used for accumulating statistics on natural language text. The size of an internet corpus can be, for example, one trillion (1,000,000,000,000) words or several trillion words, as opposed to more typical corpus sizes of up to 2 billion words. A small sample of the web, such as the web corpus, includes 10 billion words, which is significantly less than one percent of the web texts indexed by search engines, such as GOOGLE®. The present invention can work with a sample of the web, such as the web corpus, but preferably it utilizes a significantly larger sample of the web for the task of text correction.

An internet corpus is preferably employed in the following way:

A local index is built up over time by crawling and indexing the internet. The number of occurrences of each CFS provides the CFS frequency. The local index, as well as the search queries, may be based on selectable parts of the internet and may be identified with those selected parts. Similarly, parts of the internet may be excluded or appropriately weighted in order to correct anomalies between internet usage and general language usage. In such a way, websites that are reliable in terms of language usage, such as news and government websites, may be given greater weight than other websites, such as chat or user forums.

Preferably, input text is initially supplied to spelling correction functionality 112 and thereafter to misused word and grammar correction functionality 114. The input text may be any suitable text and in the context of a small keyboard devices application is preferably a part of a message or an email, such as a sentence.

Preferably, the language correction module 100 provides an output which includes corrected text accompanied by one or more suggested alternatives for each corrected word or group of words.

Figure 2:
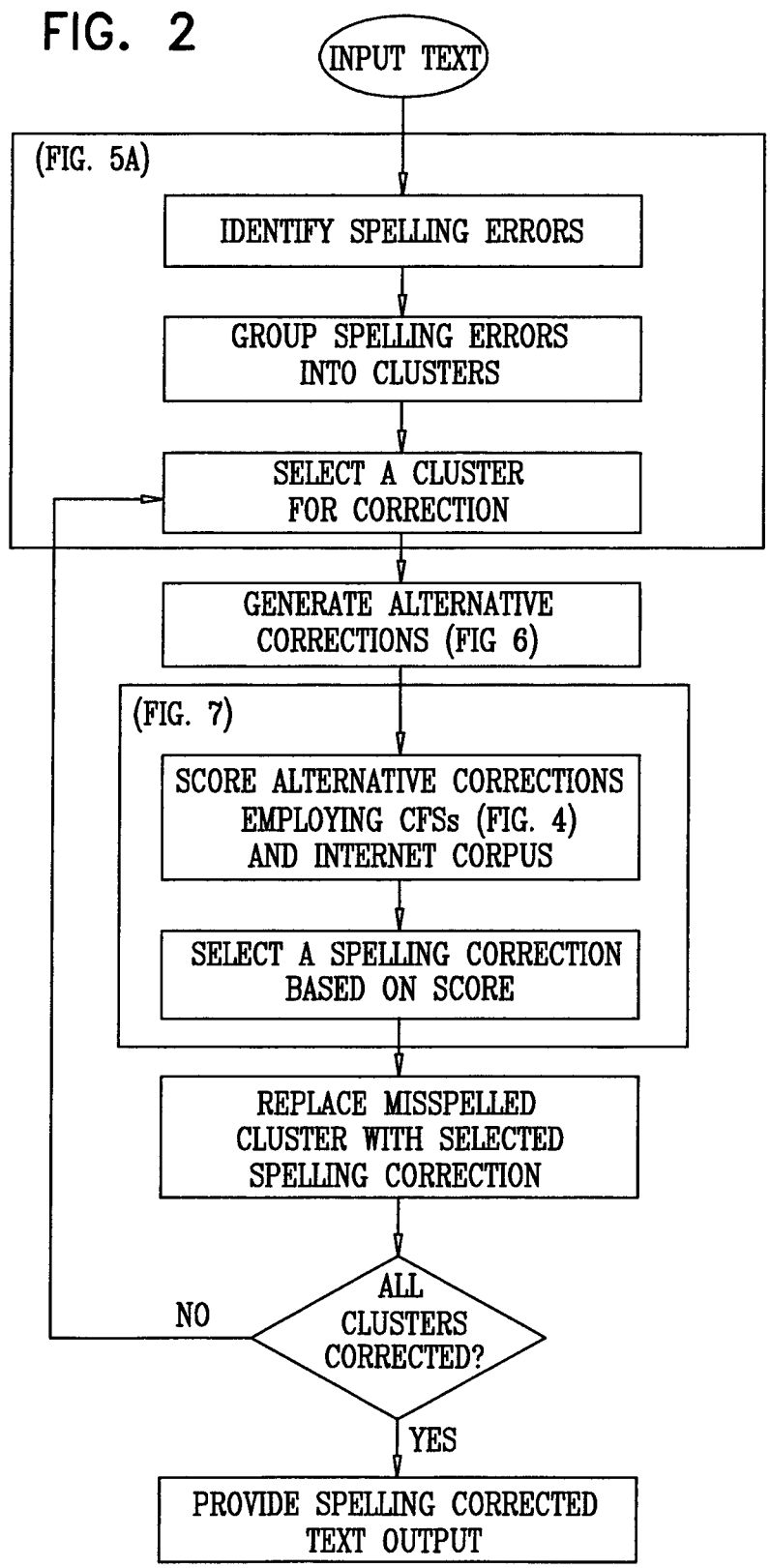
FIG. 2 is a simplified flow chart illustrating spelling correction functionality, preferably employed in the system and functionality of FIG. 1.
Figure 7:
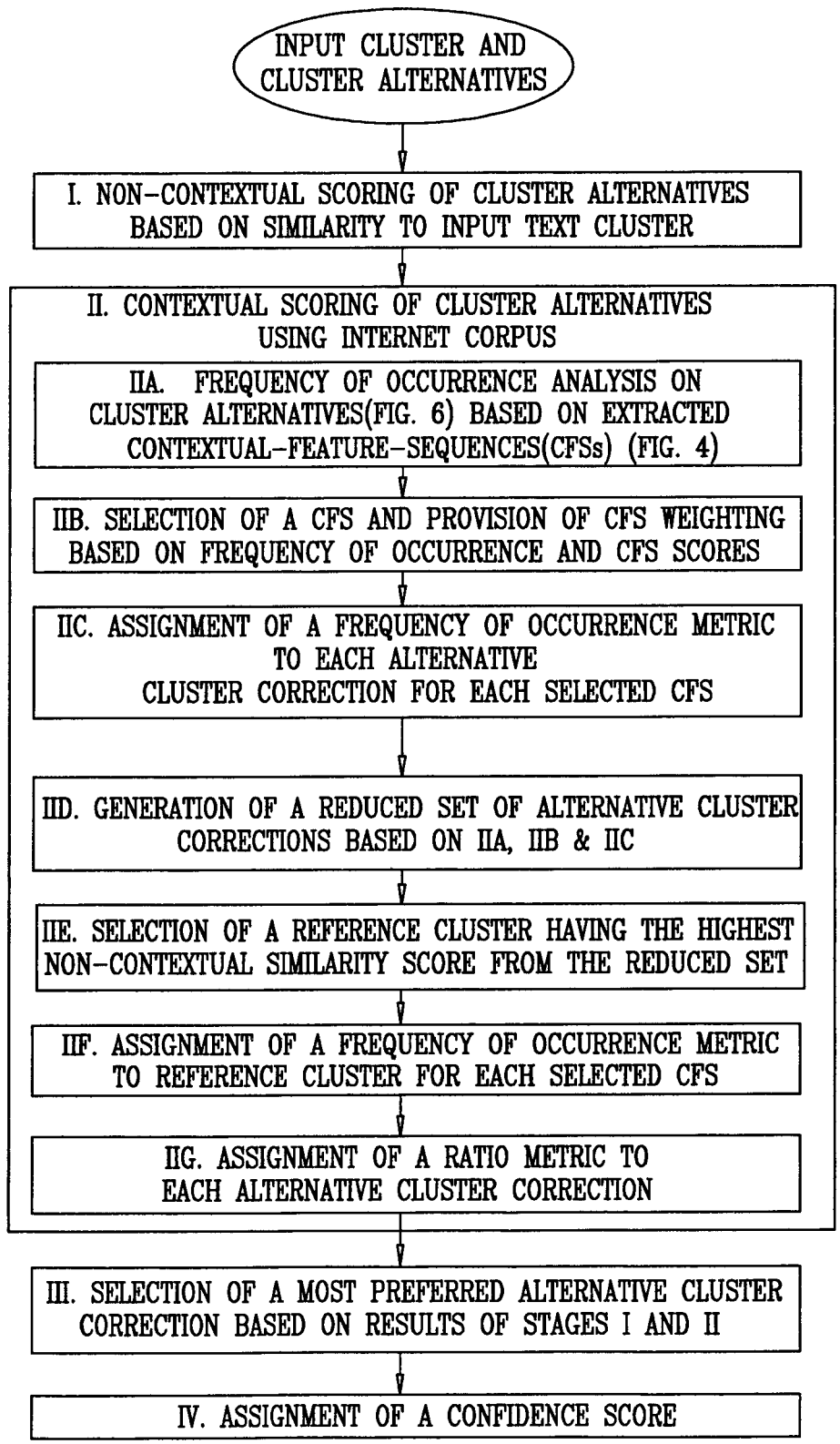
FIG. 7 is a simplified flow chart illustrating functionality for non-contextual word similarity-based scoring and contextual scoring, preferably using an internet corpus, of various alternative corrections useful in the spelling correction functionality of FIG. 2.

Reference is now made to FIG. 2, which is a simplified flow chart illustrating spelling correction functionality, preferably employed in the system and functionality of FIG. 1. As seen in FIG. 2, the spelling correction functionality preferably comprises the following steps:

identifying spelling errors in an input text, preferably using a conventional dictionary enriched with proper names and words commonly used on the internet. Preferably, the dictionary is also enriched with the content from the user's phone and/or personal computer, such as previous emails, sms messages, documents, contacts and any other text inserted by a user on the small keyboard device or personal computer. Additionally or alternatively, the dictionary includes words manually input by a user.

grouping spelling errors into clusters, which may include single or multiple words, consecutive or near consecutive, having spelling mistakes and selecting a cluster for correction. This selection attempts to find the cluster which contains the largest amount of correct contextual data. Preferably, the cluster that has the longest sequence or sequences of correctly spelled words in its vicinity is selected. The foregoing steps are described hereinbelow in greater detail with reference to FIG. 5A.

generating one or preferably more alternative corrections for each cluster, preferably based on an algorithm described hereinbelow with reference to FIG. 6;

at least partially non-contextual word similarity-based scoring and contextual scoring, preferably using an internet corpus, of the various alternative corrections, preferably based on a spelling correction alternatives scoring algorithm, described hereinbelow with reference to FIG. 7;

for each cluster, selection of a single spelling correction and presentation of most preferred alternative spelling corrections based on the aforesaid scoring; and providing a corrected text output incorporating the single spelling correction for each misspelled cluster, which replaces a misspelled cluster.

The operation of the functionality of FIG. 2 may be better understood from a consideration of the following example:

The following input text is received:

If he is wuzw

In this case, the correction is suggested while the user is typing the text, before the sentence is completed. The word that was currently typed "wuzw" is identified as a spelling error and so the correction cycle begins.

The following cluster is selected, as seen in Table 1:

TABLE 1

| CLUSTER # | CLUSTER |
|---|---|
| 1 | Wuzw |

The following alternative corrections are generated for the misspelled word "wuzw" (partial list):

was, wise, eyes, wiz

Each alternative correction is given a non-contextual word similarity score, based on the proximity of keyboard keys, similarity of sound and character string to the misspelled word, for example, as seen in Table 2:

TABLE 2

| ALTERNATIVE | NON CONTEXTUAL WORD SIMILARITY SCORE |
|---|---|
| wise | 0.95 |
| was | 0.92 |
| eyes | 0.81 |
| wiz | 0.72 |

The non-contextual score may be derived in various ways. One example is by using the Levelnshtein Distance algorithm which is available on http://en.wikipedia.org/wiki/Levenshtein_distance. This algorithm can be implied on word strings, word phonetic representation, keyboard proximity representation, or a combination of all. For example, the word "wise" is similar to "wuzw" because "I" and "u" are neighbor keys on the keyboard and "w" and "e" are also neighbor keys on the keyboard, so their replacement should be considered as a "small distance" edit action in the Levenshtein distance algorithm.

Each alternative is also given a contextual score, as seen in Table 3, based on its fit in the context of the input sentence. In this example, the context that is used is "If he is <wuzw>"

TABLE 3

| ALTERNATIVE | CONTEXTUAL SCORE FOR "If he is [alternative]" | NON CONTEXTUAL WORD SIMILARITY SCORE |
|---|---|---|
| wise | 1.00 | 0.95 |
| was | 0.12 | 0.92 |
| eyes | 0.52 | 0.81 |
| wiz | 0 | 0.72 |

The contextual score is preferably derived as described hereinbelow with reference to FIG. 7 and is based on contextual feature sequence (CFS) frequencies in an internet corpus.

The word "wise" is selected as the best alternative based on a combination of the contextual score and non-contextual word similarity score, as described hereinbelow with reference to FIG. 7.

If he is wise

The user can continue and type the sentence after accepting the suggested correction. Alternatively, the user can ignore all suggested corrections and continue to type. At each point the system will suggest relevant corrections. If the user finished typing the sentence, a suggested correction for the full sentence will be offered.

Figure 3:
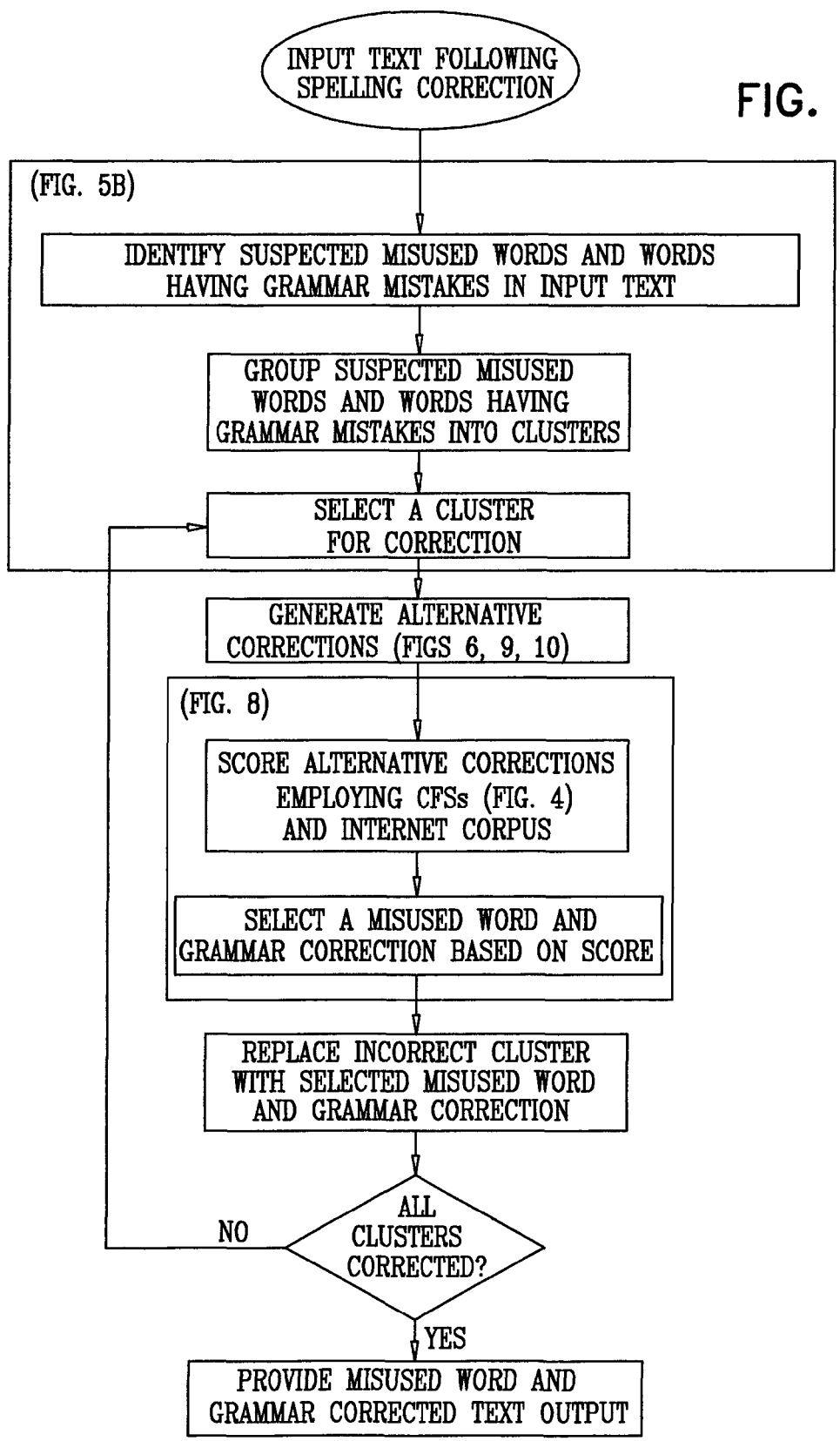
FIG. 3 is a simplified flow chart illustrating misused word and grammar correction functionality, preferably employed in the system and functionality of FIG. 1.

Reference is now made to FIG. 3, which is a simplified flow chart illustrating misused word and grammar correction functionality, preferably employed in the system and functionality of FIG. 1. The misused word and grammar correction functionality provides correction of words which are correctly spelled but misused in the context of the input text and correction of grammar mistakes, including use of a grammatically incorrect word in place of grammatically correct word, the use of a superfluous word and missing words and punctuation.

As seen in FIG. 3, the misused word and grammar correction functionality preferably comprises the following steps:

identifying suspected misused words and words having grammar mistakes in a spelling-corrected input text output from the spelling correction functionality of FIG. 2, preferably by evaluating the fit of at least most of the words within the context of the input sentence;

grouping suspected misused words and words having grammar mistakes into clusters, which are preferably non-overlapping; and selecting a cluster for correction. The identifying, grouping and selecting steps are preferably based on an algorithm described hereinbelow with reference to FIG. 5B.

generating one or preferably more alternative corrections for each cluster, preferably based on an alternative correction generation algorithm described hereinbelow with reference to FIG. 6;

generating one or preferably more alternative corrections for each cluster, based on a missing article, preposition and punctuation correction algorithm described hereinbelow with reference to FIG. 9;

generating one or preferably more alternative corrections for each cluster, based on a superfluous article, preposition and punctuation correction algorithm described hereinbelow with reference to FIG. 10;

at least partially context-based and word similarity-based scoring of the various alternative corrections, preferably based on a misused word and grammar correction alternatives scoring algorithm, described hereinbelow with reference to FIG. 8;

for each cluster, selection of a single misused word and grammar correction and presentation of most preferred alternative misused word and grammar corrections based on the aforesaid scoring as also described hereinbelow with reference to FIG. 8; and providing a spelling, misused word and grammar-corrected text output incorporating the single misused word and grammar correction for each cluster, which replaces an incorrect cluster.

Preferably, the scoring includes applying a bias in favor of the suspect word vis-à-vis ones of the multiple alternatives therefor, the bias being a function of an input uncertainty metric indicating uncertainty of a person providing the input.

The operation of the functionality of FIG. 3 may be better understood from a consideration of the following example:

The following input text is received:
Put it on a singe lost
The following words are identified as suspected misused words:
  singe, lost
The following cluster is generated:
  singe lost
The following are examples of alternative corrections which are generated for the cluster (partial list):
  sing last; single list; song list; sing least; ding lost; ding last; swing list; singer lost; singer lot; single lot; sing lot; ding lot; sing lots; swing lots; single lots
The results of at least partially contextual scoring using an internet corpus context-based and non-contextual word similarity-based scoring are presented in Table 4:

TABLE 4

| CLUSTER | NON CONTEXTUAL SIMILARITY SCORE | CONTEXTUAL SCORE | GLOBAL SCORE |
|---|---|---|---|
| song list | 0.72 | 0.90 | 0.648 |
| single list | 0.84 | 1.00 | 0.840 |
| swing list | 0.47 | 0.65 | 0.306 |
| single lots | 0.82 | 0.30 | 0.246 |
| singer lot | 0.79 | 0.45 | 0.356 |
| sing least | 0.72 | 0.55 | 0.396 |
| ding lost | 0.67 | 0.00 | 0.000 |

It is appreciated that there exist various ways of arriving at a global score. The preferred global score is based on the algorithm described hereinbelow with reference to FIG. 8.

Based on the above scoring the alternative "single list" is selected. Thus, the corrected text is:
Put it on a single list.

Figure 4:
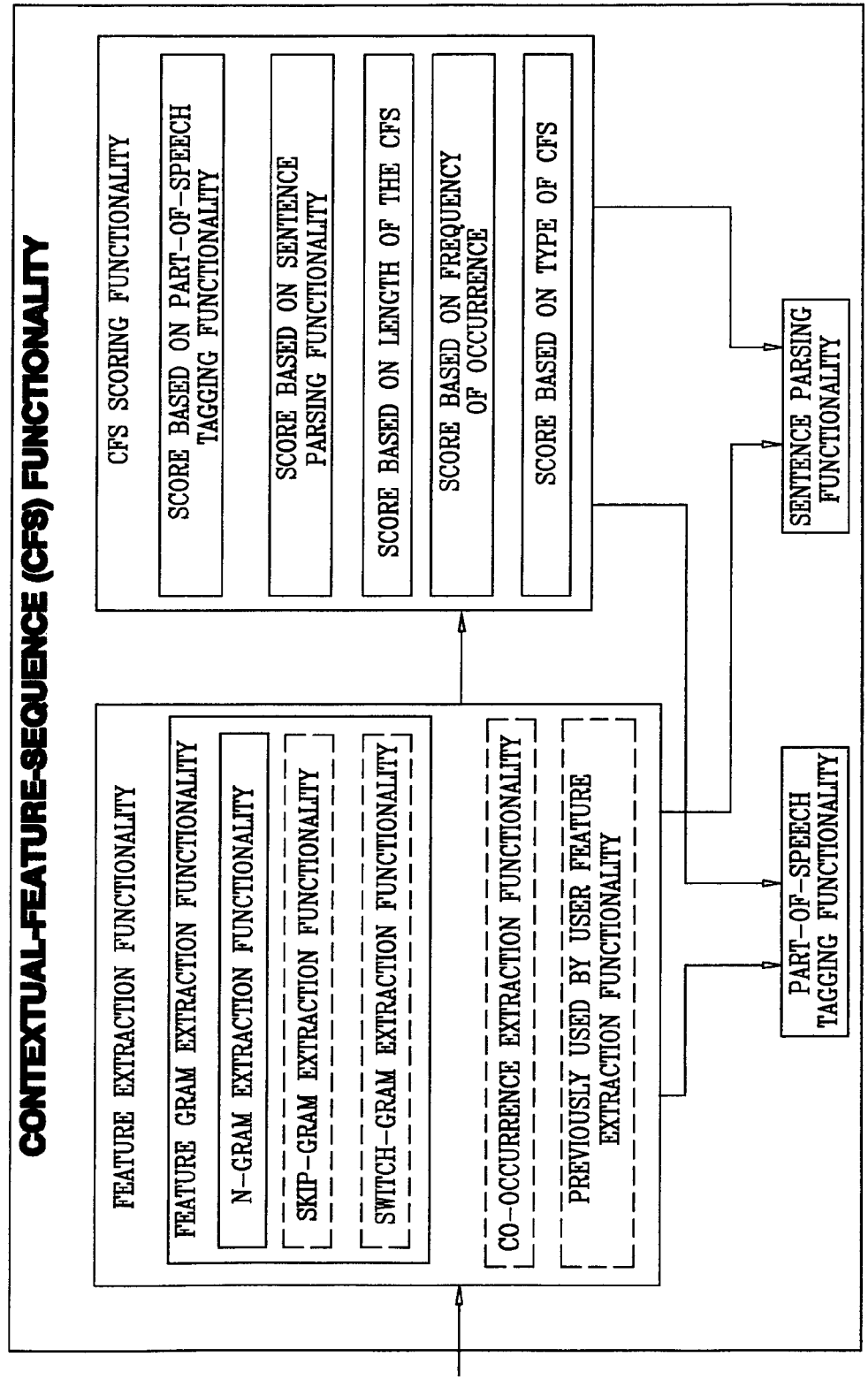
FIG. 4 is a simplified block diagram illustrating contextual-feature-sequence (CFS) functionality, preferably employed in the system and functionality of FIG. 1.

Reference is now made to FIG. 4, which is a simplified block diagram illustrating contextual-feature-sequence (CFS) functionality 118 (FIG. 1) useful in the system and functionality for computer-assisted language correction of a preferred embodiment of the present invention.

The CFS functionality 118 preferably includes feature extraction functionality including N-gram extraction functionality and optionally at least one of skip-gram extraction functionality; switch-gram extraction functionality; co-occurrence extraction functionality; and previously used by user feature extraction functionality.

The term N-gram, which is a known term of the art, refers to a sequence of N consecutive words in an input text. The N-gram extraction functionality may employ conventional part-of-speech tagging and sentence parsing functionality in order to avoid generating certain N-grams which, based on grammatical considerations, are not expected to appear with high frequency in a corpus, preferably an interne corpus.

For the purposes of the present description, the term "skip-gram extraction functionality" means functionality operative to extract "skip-grams" which are modified n-grams which leave out certain non-essential words or phrases, such as adjectives, adverbs, adjectival phrases and adverbial phrases, or which contain only words having predetermined grammatical relationships, such as subject-verb, verb-object, adverb-verb or verb-time phrase. The skip-gram extraction functionality may employ conventional part-of-speech tagging and sentence parsing functionality to assist in deciding which words may be skipped in a given context.

For the purposes of the present description, the term "switch-gram extraction functionality" means functionality which identifies "switch grams", which are modified n-grams in which the order of appearance of certain words is switched.

The switch-gram extraction functionality may employ conventional part-of-speech tagging and sentence parsing functionality to assist in deciding which words may have their order of appearance switched in a given context.

For the purposes of the present description, the term "co-occurrence extraction functionality" means functionality which identifies word combinations in an input sentence or an input document containing many input sentences, having input text word co-occurrence for all words in the input text other than those included in the N-grams, switch-grams or skip-grams, together with indications of distance from an input word and direction, following filtering out of commonly occurring words, such as prepositions, articles, conjunctions and other words whose function is primarily grammatical.

For the purposes of the present description, the term "previously used by user feature extraction functionality" means functionality which identifies words used by a user in other documents, following filtering out of commonly occurring words, such as prepositions, articles, conjunctions and other words whose function is primarily grammatical.

For the purposes of the present description, N-grams, skip-grams, switch-grams and combinations thereof are termed feature-grams.

For the purposes of the present description, N-grams, skip-grams, switch-grams, co-occurrences, "previously used by user features" and combinations thereof are termed contextual-feature-sequences or CFSs.

The functionality of FIG. 4 preferably operates on individual words or clusters of words in an input text.

The operation of the functionality of FIG. 4 may be better understood from a consideration of the following example:
The following input text is provided:
  Cherlock Homes the lead character and chief inspecter has been cold in by the family doctor Dr Mortimer, to invesigate the death of sir Charles"
For the cluster "Cherlock Homes" in the input text, the following CFSs are generated:
N-grams:
2-grams: Cherlock Homes; Homes the
3-grams: Cherlock Homes the; Homes the lead
4-grams: Cherlock Homes the lead; Homes the lead character
5-grams: Cherlock Homes the lead character
Skip-grams:
Cherlock Homes the character; Cherlock Homes the chief inspecter; Cherlock Homes the inspecter; Cherlock Homes has been cold
Switch gram:
The lead character Cherlock Homes
Co-occurrences in input text:
Character; inspector; investigate; death
Co-occurrences in document containing the input text:
Arthur Conan Doyle; story
Co-occurrence in other documents of user:
mystery
For the cluster "cold" in the input text, the following CFSs are generated:
N-grams:
2-grams: been cold; cold in
3-grams: has been cold; been cold in; cold in by
4-grams: inspector has been cold; has been cold in; been cold in by; cold in by the
5-grams: chief inspector has been cold; inspector has been cold in; has been cold in by; been cold in by the; cold in by the family Skip-grams:
  cold in to investigate; Cherlock has been cold; cold by the doctor; cold by Dr Mortimer; character has been cold The CFSs are each given an "importance score" based on at least one of, preferably more than one of and most preferably all of the following:

a. operation of conventional part-of-speech tagging and sentence parsing functionality. A CFS which includes parts of multiple parsing tree nodes is given a relatively low score. The larger the number of parsing tree nodes included in a CFS, the lower is the score of that CFS.

b. length of the CFS. The longer the CFS, the higher the score.

c. frequency of occurrence of each of the words in the CFS other than the input word. The higher the frequency of occurrence of such words, the lower the score.

d. type of CFS. For example, an N-gram is preferred over a co-occurrence. A co-occurrence in an input sentence is preferred over a co-occurrence in an input document and a co-occurrence in an input document is preferred over "previously used by user features".

Referring to the above example, typical scores are as seen in Table 5:

TABLE 5

| CFS TYPE | CFS | SCORE |
| --- | --- | --- |
| N-gram: 2-gram | Cherlock Homes | 0.50 |
| N-gram: 2-gram | Homes the | 0.30 |
| N-gram: 3-gram | Cherlock Homes the | 0.70 |
| N-gram: 3-gram | Homes the lead | 0.70 |
| N-gram: 4-gram | Cherlock Homes the lead | 0.90 |
| N-gram: 4-gram | Homes the lead character | 0.90 |
| N-gram: 5-gram | Cherlock Homes the lead character | 1.00 |
| Skip-gram | Cherlock Homes the character | 0.80 |
| Skip-gram | Cherlock Homes the chief inspecter | 0.95 |
| Skip-gram | Cherlock Homes the inspecter | 0.93 |
| Skip-gram | Cherlock Homes has been cold | 0.93 |
| Switch gram | The lead character Cherlock Homes | 0.95 |
| Co-occurrence in input text | Character | 0.40 |
| Co-occurrence in input text | Inspector | 0.40 |
| Co-occurrence in input text | Investigate | 0.40 |
| Co-occurrence in input text | Death | 0.40 |
| Co-occurrence in document containing the input text: | Arthur Conan Doyle | 0.50 |
| Co-occurrence in document containing the input text: | Story | 0.30 |
| Co-occurrence in other documents of user | Mystery | 0.20 |

These CFSs and their importance scores are used in the functionality described hereinbelow with reference to FIGS. 7 & 8 for context based scoring of various alternative cluster corrections, based on the CFS frequencies of occurrences in an internet corpus.

Figure 5A:
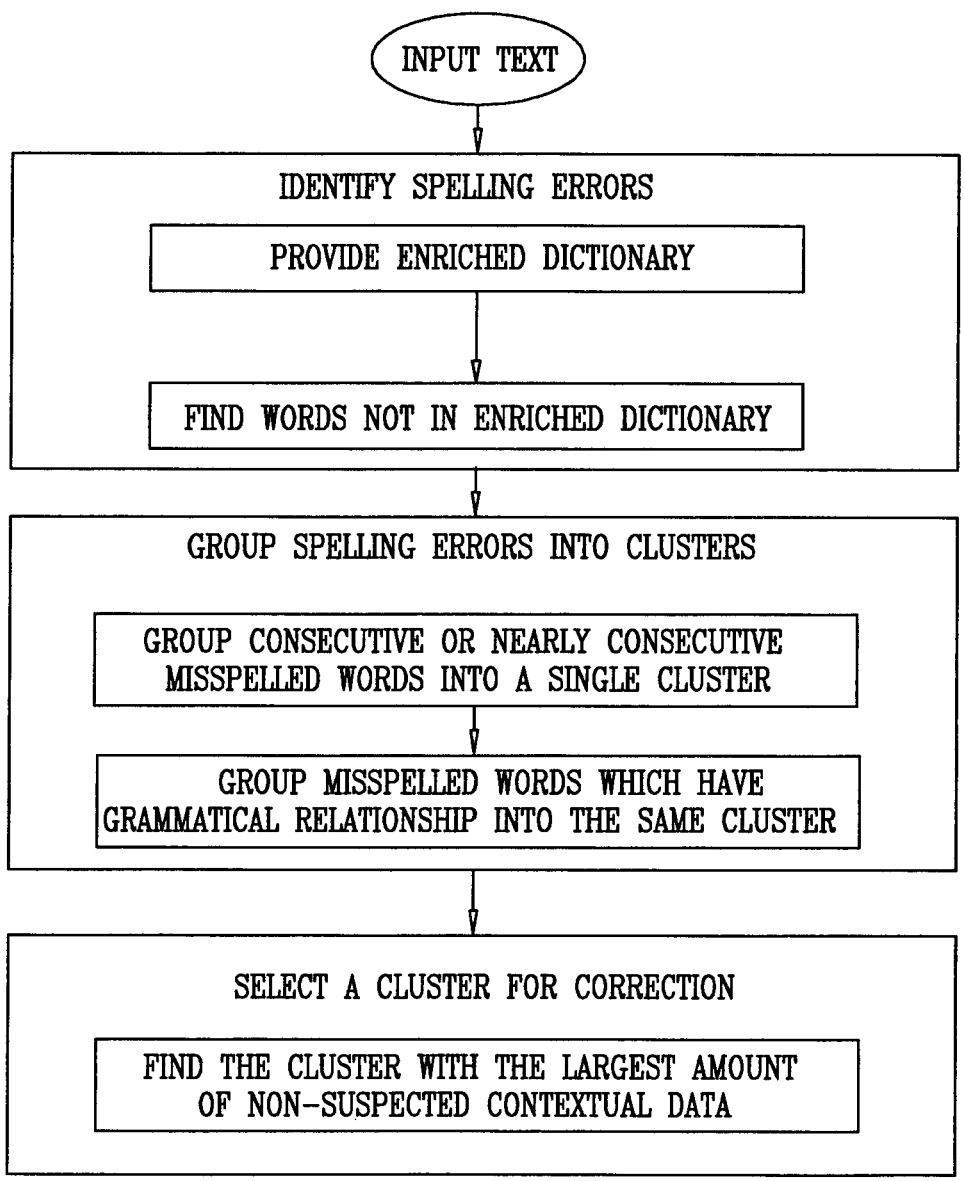
FIG. 5A is a simplified flow chart illustrating spelling correction functionality forming part of the functionality of FIG. 2 in accordance with a preferred embodiment of the present invention.

Reference is now made to FIG. 5A, which is a simplified flow chart illustrating functionality for identifying misspelled words in the input text; grouping misspelled words into clusters, which are preferably non-overlapping; and selecting a cluster for correction.

As seen in FIG. 5A, identifying misspelled words is preferably carried out by using a conventional dictionary enriched with proper names and words commonly used on the internet. Preferably, the dictionary is also enriched with content from the user's phone and computer, such as emails, sms messages, documents, contacts and any other text inserted by a user on the small keyboard device or personal computer. Additionally or alternatively, the dictionary includes words manually input by a user.

Grouping misspelled words into clusters is preferably carried out by grouping consecutive or nearly consecutive misspelled words into a single cluster along with misspelled words which have a grammatical relationship.

Selecting a cluster for correction is preferably carried out by attempting to find the cluster which contains the largest amount of non-suspected contextual data. Preferably, the cluster that has the longest sequence or sequences of correctly spelled words in its vicinity is selected.

Figure 5B:
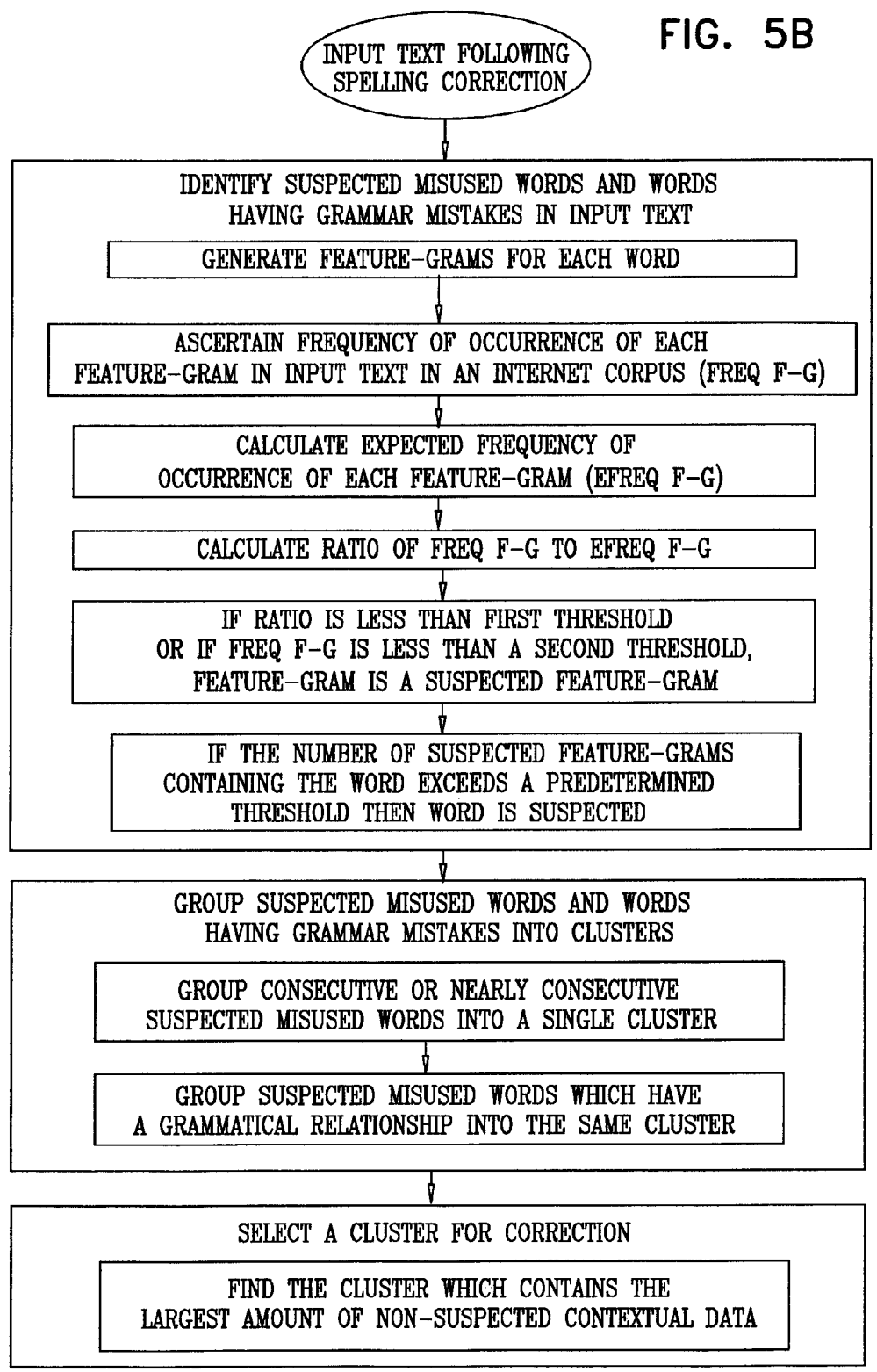
FIG. 5B is a simplified flow chart illustrating misused word and grammar correction functionality forming part of the functionality of FIG. 3 in accordance with a preferred embodiment of the present invention.

Reference is now made to FIG. 5B, which is a simplified flow chart illustrating functionality for identifying suspected misused words and words having grammar mistakes in a spelling-corrected input text; grouping suspected misused words and words having grammar mistakes into clusters, which are preferably non-overlapping; and selecting a cluster for correction.

Identifying suspected misused words is preferably carried out as follows:

feature-grams are generated for each word in the spelling-corrected input text;

the frequency of occurrence of each of the feature-grams in a corpus, preferably an internet corpus, is noted;

the number of suspected feature-grams for each word is noted. Suspected feature-grams have a frequency which is lower than their expected frequency or which lies below a minimum frequency threshold. The expected frequency of a feature-gram is estimated on the basis of the frequencies of its constituent elements and combinations thereof.

a word is suspected if the number of suspected feature-grams containing the word exceeds a predetermined threshold.

In accordance with a preferred embodiment of the invention, the frequency of occurrence of each feature-gram in the spelling-corrected input text in a corpus (FREQ F-G), preferably an internet corpus, is ascertained. The frequency of occurrence of each word in the spelling-corrected input text in that corpus (FREQ W) is also ascertained and the frequency of occurrence of each feature-gram without that word (FREQ FG-W) is additionally ascertained.

An expected frequency of occurrence of each feature-gram (EFREQ F-G) is calculated as follows:

EFREQ F-G=FREQ F-G-W*FREQ W/(TOTAL OF FREQUENCIES OF ALL WORDS IN THE CORPUS)

If the ratio of the frequency of occurrence of each feature-gram in the spelling-corrected input text in a corpus, preferably an internet corpus, to the expected frequency of occurrence of each feature-gram, FREQ F-G/EFREQ F-G, is less than a predetermined threshold, or if FREQ F-G is less than another predetermined threshold, the feature-gram is considered to be a suspected feature-gram. Every word that is included in a suspected feature-gram is considered to be a suspected misused word or a word having a suspected grammar mistake.

The operation of the functionality of FIG. 5B for identifying suspected misused words and words having grammar mistakes in a spelling-corrected input text may be better understood from a consideration of the following example:

The following spelling-corrected input text is provided:
Pleads call me soon

Note that the misused word "pleads" is a result of a key insertion "d" which is a neighbor of the key "s", and an omission of the key "e".

The feature-grams include the following:
Pleads; Pleads call; Pleads call me; Pleads call me soon Table 6 indicates the frequencies of occurrence in an internet corpus of the above feature-grams:

TABLE 6

| WORD | FREQUENCY | | | |
| --- | --- | --- | --- | --- |
| | 1-GRAM | 2-GRAMS | 3-GRAMS | 4-GRAMS |
| Pleads | Pleads 241000 | Pleads call 15 | Pleads call me 0 | Pleads call me soon 0 |
| call | call 94407545 | call me 2549476 | call me soon 1562 | |
| me | me 457944364 | me soon 61615 | | |
| soon | soon 51023168 | | | |

The expected frequencies of occurrence are calculated for each of the 2-grams as follows:

EFREQ F-G=(FREQ F-G-W*FREQ W)/(TOTAL OF FREQUENCIES OF ALL WORDS IN THE CORPUS)

For example, for a 2-gram, the expected 2-gram frequency for a 2-gram (x,y)=(1-gram frequency of x*1-gram frequency of y)/Number of words in the internet corpus. e.g., Trillion (1,000,000,000,000) words.

The ratio of the frequency of occurrence of each feature-gram in the spelling-corrected input text in a corpus, preferably an internet corpus, to the expected frequency of occurrence of each feature-gram is calculated as follows:

FREQ F-G/EFREQ F-G

The ratio of the frequency of occurrence of each of the above 2-grams in the spelling-corrected input text in a corpus, preferably an internet corpus, to the expected frequency of occurrence of each of the above 2-grams are seen in Table 7:

TABLE 7

| 2-GRAMS | FREQ F-G | EFREQ F-G | FREQ F-G/EFREQ F-G |
| --- | --- | --- | --- |
| Pleads call | 15 | 22.7522183 | 0.65927637 |
| call me | 2549476 | 43233.4032 | 58.9700513 |
| me soon | 61615 | 23365.7722 | 2.63697683 |

It is seen that FREQ F-G of "Pleads call" is lower than its expected frequency and thus FREQ F-G/EFREQ F-G may be considered to be lower than a predetermined threshold, such as 1, and therefore the cluster "Pleads call" is suspected. It is seen that the 3-gram and the 4-gram including the words "Pleads call" both have a zero frequency in the internet corpus. This can also be a basis for considering "Pleads call" to be suspect.

Grouping suspected misused words and words having grammar mistakes into clusters is preferably carried out as follows: consecutive or nearly consecutive suspected misused words are grouped into a single cluster; and suspected misused words which have a grammatical relationship between themselves are grouped into the same cluster.

Selecting a cluster for correction is preferably carried out by attempting to find the cluster which contains the largest amount of non-suspected contextual data. Preferably, the cluster that has the longest sequence or sequences of non-suspected words in its vicinity is selected.

Figure 6:
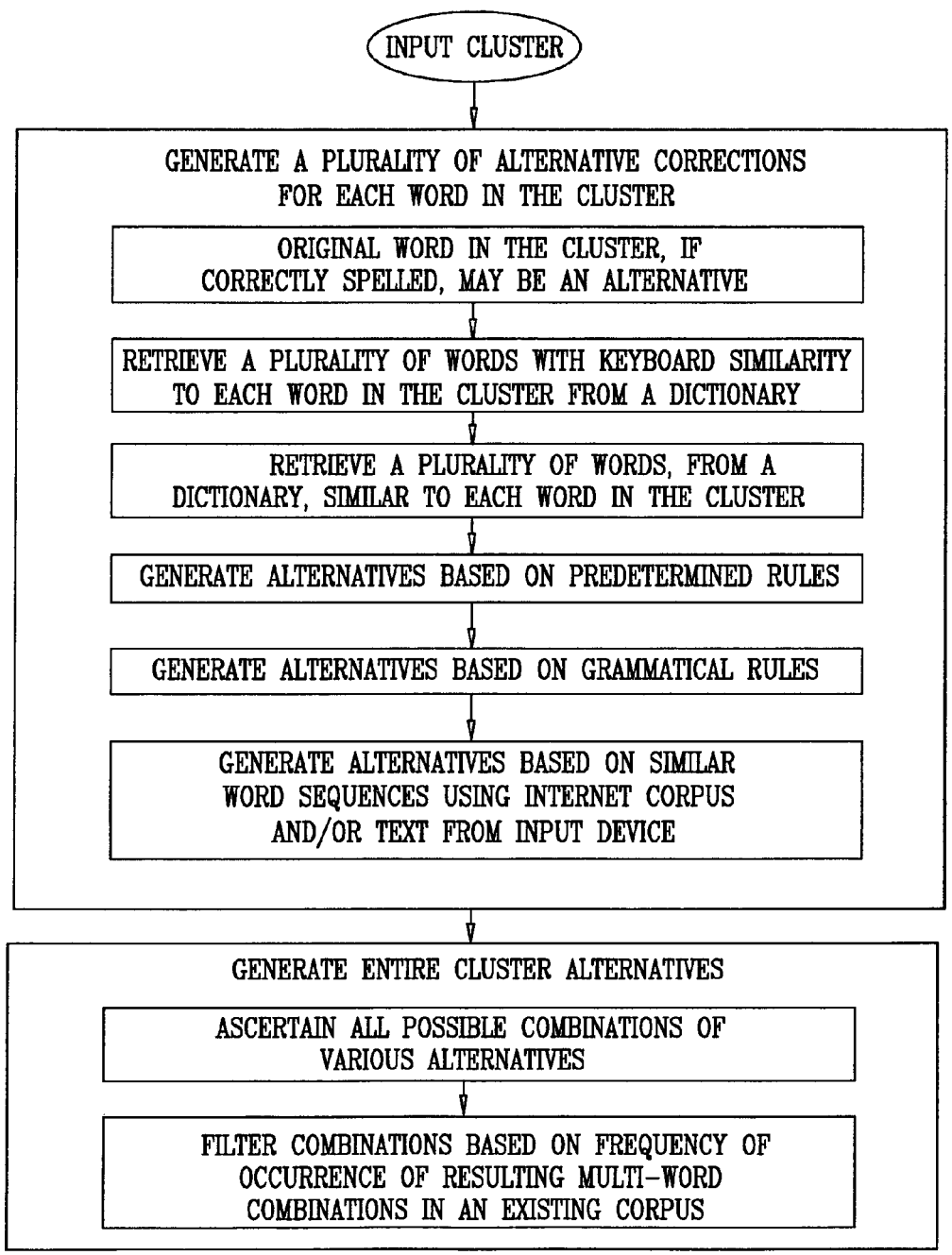
FIG. 6 is a simplified flow chart illustrating functionality for generating alternative corrections which is useful in the functionalities of FIGS. 2 and 3.

Reference is now made to FIG. 6, which is a simplified flow chart illustrating functionality for generating alternative corrections for a cluster, which is useful in the functionalities of FIGS. 2 and 3.

If the original input word is correctly spelled, it is considered as an alternative.

As seen in FIG. 6, for each word in the cluster, a plurality of alternative corrections is initially generated in the following manner:

A plurality of words, taken from a dictionary, similar to each word in the cluster, on the basis of written appearance as expressed in character string similarity, and on the basis of sound or phonetic similarity, is retrieved. The functionality for the retrieval of words based on their character string similarity is known and available on the internet as freeware, such as GNU Aspell and Google® GSpell. This functionality can be extended by the keyboard keys location proximity, such that replacement, insertions, deletions, the retrieved and prioritized words provide a first plurality of alternative corrections. E.g., given the input word feezix, the word "physics" will be retrieved from the dictionary, based on a similar sound, even though it has only one character, namely "i", in common. The word "felix" will be retrieved, based on its string character similarity, even though it doesn't have a similar sound.

Additional alternatives may be generated by the following actions or any combination of these actions:

1. Adjacent keys confusion. The user may have pressed on a key adjacent to the intended key. As described hereinabove—intending to press A, the user could have instead pressed Q, W, S, Z or X, which are keys adjacent to it. Thus, wishing to write "abbreviated" he could have written "sbbreviated", replacing the first A with S.

There exist different organizations of keys on keyboards, and the diagram is only an example. The input probabilities of keyboard replacement based on physical distance in the keyboard can be supplied for each kind of keyboard.

2. Multiple keys insertion. The user may have placed their fingers in between two adjacent keys and thus two keys will be pressed and inserted instead of one. Thus, wishing to write "abbreviated", the user could have written "sabbreviated" or "asbbreviated", as the "s" key is adjacent to the "a" key. Some keys are adjacent to the space key as well, such as "v", and so the following spelling mistake is possible as well in the same manner: "abbre viated".

3. Intended pressed keys omission. Typing quickly and/or inaccurately, some of the intended keys pressed may not be caught by the small keyboard devices, thus resulting in missing letters, punctuation marks or spaces. Thus, wishing to write "abbreviated", the user could have written "bbreviated". Similarly, the space key may be missed, and then the next word will not be separated from the current, resulting in a spelling error. Thus, wishing to write "abbreviated text", the user could have written "abbreviatedtext".

4. Missing vowels and common shorthand lingo. Omission of vowels and usage of particular phonetic misspellings, such as replacing either C, CK or Q with K, or the replacement of S and TH with Z, are common habits of people writing short text messages, wishing to express themselves quickly. Thus the word "quick" can be written as "kwik" and the word "please" can be written as "plz". Additionally, numbers and symbols may be used as well as phonetic tools, thus writing 'before' as 'be4' and 'at' as '@'.

5. Phonetic similarity and written similarity mistakes. In addition to spelling errors that are a result of the small size or limited sensitivity of small keyboard devices, words may be misspelled due to phonetic and written confusables, as can happen in text written using any device or manually. For example, "ocean" can be misspelled as the similar sound word "oshen" or as the similar writing word "ossion".

6. Combinations of all the above. Any of error types described above can be combined in the same misspelled word and can occur more than once in the same misspelled word. E.g., the user may write "oictiopn" instead of "auction" by a combination of two errors, one of them repeating twice:
    a. Phonetic similarity mistake may occur for the combination "au" in the word "auction", which sounds like "o", resulting in writing "oction" instead of "auction".
    b. In combination with this previous mistake, a multiple keys insertion may occur for the above "o" in the beginning of the word, resulting in writing "oi". "auction" will then be misspelled as "oiction"
    c. Additional multiple keys insertion may occur also for the original "o" in the word "auction", resulting in writing "op" instead of "o". "auction" will then be misspelled as "oictiopn"

Additional alternatives may be generated by employing rules based on known alternative usages as well as accumulated user inputs. E.g., u→you, r→are, Im→I am.

Further alternatives may be generated based on grammatical rules, preferably employing pre-defined lists. A few examples follow: singular/plural rules: If the input sentence is "leaf fall off trees in the autumn" the plural alternative "leaves" is generated.

article rules: If the input text is "a old lady", the alternative articles "an" & "the" are generated.

preposition rules: If the input text is "I am interested of football", the alternative prepositions "in", "at", "to", "on", "through", . . . are generated.

verb inflection rules: If the input text is "He leave the room", the alternative verb inflections "left", "leaves", "had left", . . . are generated.

merged words and split words rules: If the input text is "get alot fitter", the alternative "a lot" is generated.

If the input text is "we have to wat ch out", the alternative "watch" is generated.

If the input text is "do many sittups", the alternative "sit ups" is generated.

It is a particular feature of a preferred embodiment of the present invention that contextual information, such as CFSs and more particularly feature-grams, is employed to generate alternative corrections and not only for scoring such "contextually retrieved" alternative corrections. Frequently occurring word combinations, such as CFSs and more particularly feature-grams, may be retrieved from the user's phone texts, such as previous emails, sms messages, and contacts, and from the user's computer, such as documents and emails, and from an existing corpus, such as an internet corpus.

The following example illustrates this aspect of the present invention:

If the input sentence is:
"Way to go girl! This is my Donna premadma . . . "
Please note that the spelling mistake "premadma" was caused by phonetic replacement of "i" with "e", omission of space and "o", proximate keys replacement of "n" with "m" and failing to press "n" twice.

the word "premadma" may not be sufficiently similar in keyboard proximity, sound or writing to the word "prima donna" such that absent this aspect of the invention, "prima donna" might not be one of the alternatives.

In accordance with this aspect of the present invention, by looking in the text available on the user's small keyboard device or the user's personal computer, such as sms messages, mail messages, and personal contacts for words which commonly appear after the n-gram "my Donna", i.e., all words found as * in the query "my Donna *", the following alternatives are retrieved:

madonna; prima donna; donn; did it again; dear;

In accordance with a preferred embodiment of the present invention, the "contextually retrieved" alternatives are then filtered, such that only contextually retrieved alternatives having some keyboard proximity, phonetic or writing similarity to the original word, in the present example "premadma", remain. In this example, the alternative having the highest phonetic and writing similarity, "prima donna", is retrieved.

Where the input text is generated automatically by an external system, such as speech-to-text, additional alternatives may be received directly from such system. Such additional alternatives typically are generated in the course of operation of such system. For example, in a speech recognition system, the alternative words of the same sound word may be supplied to the present system for use as alternatives.

Once all of the alternatives for each of the words in the cluster have been generated, cluster alternatives for the entire cluster are generated by ascertaining all possible combinations of the various alternatives and subsequent filtering of the combinations based on the frequency of their occurrence in a corpus, preferably an internet corpus.

Figure 8:
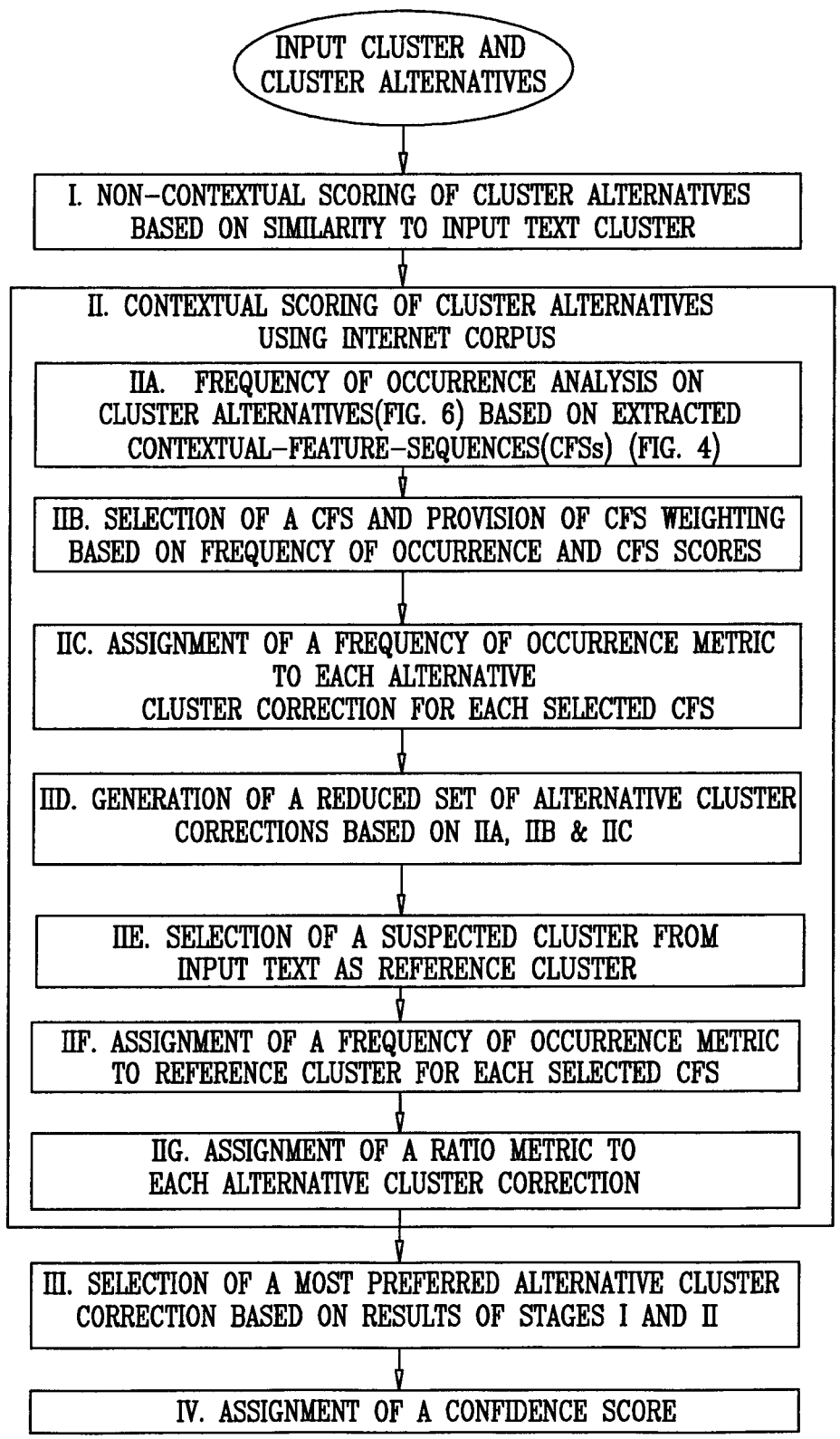
FIG. 8 is a simplified flow chart illustrating functionality for non-contextual word similarity-based scoring and contextual scoring, preferably using an internet corpus, of various alternative corrections useful in the misused word and grammar correction functionalities of FIGS. 3, 9 and 10.

The following example is illustrative:

If the input cluster is "singe lost", and the alternatives for the word "singe" are (partial list):
sing; single; singer
and the alternatives for the word "lost" are (partial list):
last; list; lot The following cluster alternatives are generated:
sing last; sing list; sing lot; single last; single list; single lot; singer last; singer list; singer lot;

Reference is now made to FIG. 8, which is a simplified flow chart illustrating functionality for context-based and word similarity-based scoring of various alternative enhancements useful in the spelling correction functionality of FIG. 2.

As seen in FIG. 8, the context-based and word similarity-based scoring of various alternative corrections proceeds in the following general stages:

I. NON-CONTEXTUAL SCORING—Various cluster alternatives are scored on the basis of similarity to a cluster in the input text in terms of keyboard proximity, their written appearance, and sound similarity. This scoring does not take into account any contextual similarity outside of the given cluster.

II. CONTEXTUAL SCORING USING INTERNET CORPUS—Each of the various cluster alternatives is also scored on the basis of extracted contextual-feature-sequences (CFSs), which are provided as described hereinabove with reference to FIG. 4. This scoring includes the following sub-stages:

IIA. Frequency of occurrence analysis is carried out, preferably using an internet corpus, on the various alternative cluster corrections produced by the functionality of FIG. 6, in the context of the CFSs extracted as described hereinabove with reference to FIG. 4.

IIB. CFS selection and weighting of the various CFSs is carried out based on, inter alia, the results of the frequency of occurrence analysis of sub-stage IIA. Weighting is also based on relative inherent importance of various CFSs. It is appreciated that some of the CFSs may be given a weighting of zero and are thus not selected. The selected CFSs preferably are given relative weightings.

IIC. A frequency of occurrence metric is assigned to each alternative correction for each of the selected CFSs in sub-stage IIB.

IID. A reduced set of alternative cluster corrections is generated, based, inter alia, on the results of the frequency of occurrence analysis of sub-stage IIA, the frequency of occurrence metric of sub-stage IIC and the CFS selection and weighting of sub-stage IIB.

IIE. The cluster having the highest non-contextual similarity score in stage I is selected from the reduced set in sub-stage IID for use as a reference cluster correction.

IIF. A frequency of occurrence metric is assigned to the reference cluster correction of sub-stage IIE for each of the selected CFSs in stage IIB.

IIG. A ratio metric is assigned to each of the selected CFSs in sub-stage IIB which represents the ratio of the frequency of occurrence metric for each alternative correction for that feature to the frequency of occurrence metric assigned to the reference cluster of sub-stage IIE.

III. A most preferred alternative cluster correction is selected based on the results of stage I and the results of stage II.

IV. A confidence level score is assigned to the most preferred alternative cluster correction.

A more detailed description of the functionality described hereinabove in stages II-IV is presented hereinbelow:

With reference to sub-stage IIA, all of the CFSs which include the cluster to be corrected are generated as described hereinabove in FIG. 4. CFSs containing suspected errors, other than errors in the input cluster, are eliminated.

A matrix is generated indicating the frequency of occurrence in a corpus, preferably an internet corpus, of each of the alternative corrections for the cluster in each of the CFSs. All CFSs for which all alternative corrections have a zero frequency of occurrence are eliminated. Thereafter, all CFSs which are entirely included in other CFSs having at least a minimum threshold frequency of occurrence are eliminated.

The following example illustrates generation of a frequency of occurrence matrix:

The following input text is provided:
please cskk ne the minute you see this

Please note that the spelling mistake "cskk" was caused by two proximate keys replacement: "a" was replaced by the proximate key "s", and "l" was replaced by the proximate key "k" (twice).

Using the functionality described hereinabove with reference to FIG. 5A, the following cluster is selected for correction:
cskk ne Using the functionality described hereinabove with reference to FIG. 6, the following alternative cluster corrections are generated (partial list):
ask me; vale new; call me; cake near; call new; cell new Using the functionality described hereinabove with reference to FIG. 4, the following CFSs are generated (partial list):
'cskk ne'; 'please cskk ne'; 'cskk ne the'; 'please cskk ne the'; 'cskk ne the minute'; 'please cskk ne the minute'; 'cskk ne the minute you'

Using the functionality described hereinabove with reference to Stage IIA, the matrix of frequencies of occurrence in an internet corpus seen in Table 8 is generated for the above list of alternative cluster corrections in the above list of CFSs:

TABLE 8

| CFS/ ALTERNATIVE CLUSTER CORRECTION | 'cskk ne' | 'please cskk ne' | 'cskk ne the' | 'please cskk ne the' | 'cskk ne the minute' | 'please cskk ne the minute' | 'cskk ne the minute you' |
|---|---|---|---|---|---|---|---|
| call me | 2549476 | 91843 | 42110 | 207 | 112 | 54 | 0 |
| ask me | 2279917 | 18160 | 21014 | 54 | 0 | 0 | 0 |
| call new | 8233 | 17 | 0 | 0 | 0 | 0 | 0 |
| cell new | 1975 | 0 | 0 | 0 | 0 | 0 | 0 |
| vale new | 223 | 0 | 0 | 0 | 0 | 0 | 0 |
| cake near | 234 | 0 | 0 | 0 | 0 | 0 | 0 |

All CFSs for which all alternative corrections have a zero frequency of occurrence are eliminated. In this example the following feature-gram is eliminated:
'cskk ne the minute you'

Thereafter, all CFSs which are entirely included in other CFSs having at least a minimum threshold frequency of occurrence are eliminated. In this example the following feature-grams are eliminated:
'cskk ne'; 'please cskk ne'; 'cskk ne the'; 'please cskk ne the'; 'cskk ne the minute';

In this example the only remaining CFS is the feature-gram:
'please cskk ne the minute'

The resulting matrix appears as seen in Table 9:

TABLE 9

| CFS/ ALTERNATIVE CLUSTER CORRECTIONS | 'please cskk ne the minute' |
|---|---|
| call me | 54 |
| ask me | 0 |
| call new | 0 |
| cell new | 0 |
| vale new | 0 |
| cake near | 0 |

The foregoing example illustrates the generation of a matrix in accordance with a preferred embodiment of the present invention. In this example, it is clear that "call me" is the preferred alternative correction. It is to be appreciated that in reality, the choices are not usually so straightforward. Accordingly, in further examples presented below, functionality is provided for making much more difficult choices among alternative corrections.

Returning to a consideration of sub-stage IIB, optionally, each of the remaining CFSs is given a score as described hereinabove with reference to FIG. 4. Additionally, CFSs which contain words introduced in an earlier correction iteration of the multi-word input and have a confidence level below a predetermined confidence level threshold are negatively biased.

In the general case, similarly to that described hereinabove in sub-stage IIC, preferably, a normalized frequency matrix is generated indicating the normalized frequency of occurrence of each CFS in the internet corpus. The normalized frequency matrix is normally generated from the frequency matrix by dividing each CFS frequency by a function of the frequencies of occurrence of the relevant cluster alternatives.

The normalization is operative to neutralize the effect of substantial differences in overall popularity of various alternative corrections. A suitable normalization factor is based on the overall frequencies of occurrence of various alternative corrections in a corpus as a whole, without regard to particular CFSs.

The following example illustrates the generation of a normalized frequency of occurrence matrix:

The following input text is provided:

Oh, then are you a dwcent or a student?

Please note that the spelling mistake "dwcent" was caused by a proximate keys replacement: "o" was replaced by the proximate key "w".

Using the functionality described hereinabove with reference to FIG. 5A, the following cluster is selected for correction:

dwcent

Using the functionality described hereinabove with reference to FIG. 6, the following alternative cluster corrections are generated (partial list):

docent; decent; doesn't

Using the functionality described hereinabove with reference to FIG. 4, the following CFSs are generated (partial list):

'a dwcent'; 'dwcent or a'

Using the functionality described hereinabove with reference to Stage IIC herein, the matrix of frequencies of occurrence and normalized frequencies of occurrence in an internet corpus seen in Table 10 is generated for the above list of alternative cluster corrections in the above list of CFSs:

TABLE 10

| CFS/ ALTERNATIVE CLUSTER CORRECTION | FREQUENCY | | | NORMALIZED FREQUENCY | |
|---|---|---|---|---|---|
| | ALTERNATIVE CLUSTER CORRECTION | 'a dwcent' | 'dwcent or a' | 'a dwcent' | 'dwcent or a' |
| Docent | 101078 | 23960 | 42 | 0.2370447 | 0.0004155 |
| Decent | 8780106 | 2017363 | 114 | 0.2297652 | 0.0000130 |
| doesn't | 45507080 | 1443 | 15 | 0.0000317 | 0.0000003 |

It may be appreciated from the foregoing example that words having the highest frequencies of occurrence may not necessarily have the highest normalized frequencies of occurrence, due to substantial differences in overall popularity of various alternative corrections. In the foregoing example, "docent" has the highest normalized frequencies of occurrence and it is clear from the context of the input text that "docent" is the correct word, rather than "decent" which has higher frequencies of occurrence in the internet corpus.

It is a particular feature of the present invention that normalized frequencies of occurrence, which neutralize substantial differences in overall popularity of various alternative corrections, are preferably used in selecting among the alternative corrections. It is appreciated that other metrics of frequency of occurrence, other than normalized frequencies of occurrence, may alternatively or additionally be employed as metrics. Where the frequencies of occurrence are relatively low or particularly high, additional or alternative metrics are beneficial.

It will be appreciated from the discussion that follows that additional functionalities are often useful in selecting among various alternative corrections. These functionalities are described hereinbelow.

In sub-stage IID, each alternative cluster correction which is less preferred than another alternative cluster correction according to both of the following metrics is eliminated:

i. having a word similarity score lower than the other alternative cluster correction; and ii. having lower frequencies of occurrences and preferably also lower normalized frequencies of occurrence for all of the CFSs than the other alternative cluster correction.

The following example illustrates the elimination of alternative corrections as described hereinabove:

The following input text is provided:

I leav un a big house

Please note that the spelling mistake "leav" was caused by pressed key omission where the pressing of "e" was not registered in the small keyboard device keypad. The spelling mistake "un" was caused by proximate keys replacement: "i" was replaced by the proximate key "u".

Using the functionality described hereinabove with reference to FIG. 5A, the following cluster is selected for correction:

leav un

Using the functionality described hereinabove with reference to FIG. 6, the following alternative cluster corrections are generated (partial list):

leave in; live in; love in

Using the functionality described hereinabove with reference to FIG. 4, the following CFSs are generated (partial list):

'I leav un a'; 'leav un a big'

Using the functionality described hereinabove with reference to Stage IIC herein, the matrix of frequencies of occurrence and normalized frequencies of occurrence in an internet corpus seen in Table 11 is generated for the above list of alternative cluster corrections in the above list of CFSs:

TABLE 11

| CFS/ ALTERNATIVE CLUSTER CORRECTIONS | CLUSTER ALTERNTIVE CORRECTION | FREQUENCY 'I leav un a' | 'leav un a big' | NORMALIZED FREQUENCY 'I leav un a' | 'leav un a big' |
|---|---|---|---|---|---|
| leave in | 442650 | 1700 | 100 | 0.0038 | 0.00022 |
| live in | 15277750 | 266950 | 17800 | 0.0174 | 0.00116 |
| love in | 1023100 | 1880 | 290 | 0.0018 | 0.00028 |

In this example, the non-contextual similarity scores of the alternative cluster corrections are as indicated in Table 12:

TABLE 12

| ALTERNATIVE CLUSTER CORRECTION | SIMILARITY SCORE |
|---|---|
| leave in | 0.9 |
| live in | 0.8 |
| love in | 0.7 |

The alternative cluster correction "love in" is eliminated as it has a lower similarity score as well as lower frequencies of occurrence and lower normalized frequencies of occurrence than "live in". The alternative cluster correction "leave in" is not eliminated at this stage since its similarity score is higher than that of "live in".

As can be appreciated from the foregoing, the result of operation of the functionality of stage IID is a reduced frequency matrix and preferably also a reduced normalized frequency matrix, indicating the frequency of occurrence and preferably also the normalized frequency of occurrence of each of a reduced plurality of alternative corrections, each of which has a similarity score, for each of a reduced plurality of CFSs. The reduced set of alternative cluster corrections is preferably employed for all further alternative cluster selection functionalities as is seen from the examples which follow.

For each alternative correction in the reduced frequency matrix and preferably also in the reduced normalized frequency matrix, a final preference metric is generated. One or more of the following alternative metrics may be employed to generate a final preference score for each alternative correction:

The term "frequency function" is used below to refer to the frequency, the normalized frequency or a function of both the frequency and the normalized frequency.

A. One possible preference metric is the highest occurrence frequency function for each alternative cluster correction in the reduced matrix or matrices for any of the CFSs in the reduced matrix or matrices. For example, the various alternative cluster corrections would be scored as follows:

The following input text is provided:
A big rsgle in the sky
Please note that the spelling mistake "rsgle" was caused by two proximate keys replacement: "e" was replaced by the proximate key "r" and "a" was replaced by the proximate key "s".

Using the functionality described hereinabove with reference to FIG. 5A, the following cluster is selected for correction:
rsgle Using the functionality described hereinabove with reference to FIG. 6, the following alternative cluster corrections are generated (partial list):
regale; eagle; angle Using the functionality described hereinabove with reference to FIG. 4, the following CFSs are generated (partial list):
'big rsgle'; 'rsgle in the sky'

Using the functionality described hereinabove with reference to Stage IIC herein, the matrix of frequencies of occurrence and normalized frequencies of occurrence in an internet corpus seen in Table 13 is generated for the above list of alternative cluster corrections in the above list of CFSs:

TABLE 13

| CFS/ ALTERNATIVE CLUSTER CORRECTIONS | ALTERNATIVE CLUSTER CORRECTION | FREQUENCY 'big rsgle' | 'rsgle in the sky' | NORMALIZED FREQUENCY 'big rsgle' | 'rsgle in the sky' |
|---|---|---|---|---|---|
| regale | 72095 | 0 | 0 | 0 | 0 |
| eagle | 2407618 | 1393 | 1012 | 0.0006 | 0.7265 |
| angle | 6599753 | 934 | 521 | 0.0001 | 0.5578 |

In this example, the non-contextual similarity scores of the alternative cluster corrections are as indicated in Table 14:

TABLE 14

| ALTERNATIVE CLUSTER CORRECTION | SIMILARITY SCORE |
|---|---|
| eagle | 0.97 |
| regale | 0.91 |
| angle | 0.83 |

The alternative 'eagle' is selected because it has a CFS with a maximum frequency of occurrence and the highest similarity score.

B. Another possible preference metric is the average occurrence frequency function of all CFSs for each alternative correction. For example, the various alternative corrections would be scored as follows:
The following input text is provided:
A while ago yheee lived 3 dwarfs Please note that the spelling mistake "yheee" was caused by two proximate keys replacement: "t" was replaced by the proximate key "y" and "r" was replaced by the proximate key "e".

Using the functionality described hereinabove with reference to FIG. 5A, the following cluster is selected for correction:

yheee

Using the functionality described hereinabove with reference to FIG. 6, the following alternative cluster corrections are generated. (partial list):

the; there; you; tree

Using the functionality described hereinabove with reference to FIG. 4, the following CFSs are generated (partial list):

'ago yheee lived'; 'yheee lived 3'

Using the functionality described hereinabove with reference to Stage IIC herein, the matrix of frequencies of occurrence, normalized frequencies of occurrence and average frequency of occurrence in an internet corpus seen in Tables 15 and 16 is generated for the above list of alternative cluster corrections in the above list of CFSs:

TABLE 15

| CFS/ ALTERNATIVE CLUSTER CORRECTIONS | ALTERNATIVE CLUSTER CORRECTION | FREQUENCY | |
|---|---|---|---|
| | | 'ago yheee lived' | 'yheee lived 3' |
| the | 12611118471 | 0 | 0 |
| you | 2136016813 | 53 | 190 |
| there | 332660056 | 1966 | 40 |
| tree | 22956100 | 0 | 0 |

TABLE 16

| CFS/ ALTERNATIVE CLUSTER CORRECTIONS | NORMALIZED FREQUENCY | | AVERAGE AVERAGE FREQUENCY OF OCCRRENCE |
|---|---|---|---|
| | 'ago yheee lived' | 'yheee lived 3' | |
| the | 0 | 0 | 0 |
| you | 0.00000002 | 0.00000009 | 121.5 |
| there | 0.00000591 | 0.00000012 | 1003 |
| tree | 0 | 0 | 0 |

It is noted that "there" is selected based on the average frequency of occurrence.

In this example, the non-contextual similarity scores of the alternative cluster corrections are as indicated in Table 17:

TABLE 17

| ALTERNATIVE CLUSTER CORRECTION | SIMILARITY SCORE |
|---|---|
| you | 0.91 |
| there | 0.85 |
| tree | 0.74 |
| the | 0.67 |

It is noted that the alternative cluster correction having the highest similarity score is not selected.

C. A further possible preference metric is the weighted sum, over all CFSs for each alternative correction, of the occurrence frequency function for each CFS multiplied by the score of that CFS as computed by the functionality described hereinabove with reference to FIG. 4.

D. A Specific Alternative Correction/CFS preference metric is generated, as described hereinabove with reference to sub-stages IIE-IIG, by any one or more, and more preferably most and most preferably all of the following operations on the alternative corrections in the reduced matrix or matrices:

i. The alternative cluster correction having the highest non-contextual similarity score is selected to be the reference cluster.

ii. A modified matrix is produced wherein in each preference matrix, the occurrence frequency function of each alternative correction in each feature gram is replaced by the ratio of the occurrence frequency function of each alternative correction to the occurrence frequency function of the reference cluster.

iii. A modified matrix of the type described hereinabove in ii. is further modified to replace the ratio in each preference metric by a function of the ratio which function reduces the computational importance of very large differences in ratios. A suitable such function is a logarithmic function. The purpose of this operation is to de-emphasize the importance of large differences in frequencies of occurrence in the final preference scoring of the most preferred alternative corrections, while maintaining the importance of large differences in frequencies of occurrence in the final preference scoring, and thus elimination, of the least preferred alternative corrections.

iv. A modified matrix of the type described hereinabove in ii or iii is additionally modified by multiplying the applicable ratio or function of ratio in each preference metric by the appropriate CFS score. This provides emphasis based on correct grammatical usage and other factors which are reflected in the CFS score.

v. A modified matrix of the type described hereinabove in ii, iii or iv is additionally modified by generating a function of the applicable ratio, function of ratio, frequency of occurrence and normalized frequency of occurrence. A preferred function is generated by multiplying the applicable ratio or function of ratio in each preference metric by the frequency of occurrence of that CFS.

E. A final preference metric is computed for each alternative correction based on the Specific Alternative Correction/CFS preference metric as described hereinabove in D by multiplying the similarity score of the alternative correction by the sum of the Specific Alternative Correction/CFS preference metrics for all CFS for that Alternative Correction.

An example illustrating the use of such a modified matrix is as follows:

The following input text is provided:

I will be able to tach base with you next week

Please note that the spelling mistake "tach" was caused by the omission of the letter "o", which due to inaccurate typing did not register in the small keyboard device.

Using the functionality described hereinabove with reference to FIG. 5A, the following cluster is selected for correction:

tach

Using the functionality described hereinabove with reference to FIG. 6, the following alternative cluster corrections are generated (partial list):

teach; touch

Using the functionality described hereinabove with reference to FIG. 4, the following CFSs are generated (partial list):

'able to tach'; 'to tach base'

Using the functionality described hereinabove with reference to sub-stages IIA & IIC hereinabove, the matrix of frequencies of occurrence and normalized frequencies of occurrence in an internet corpus seen in Table 18 is generated for the above list of alternative cluster corrections in the above list of CFSs:

TABLE 18

| CFS/ ALTERNATIVE CLUSTER CORRECTIONS | FREQUENCY | | | NORMALIZED FREQUENCY | |
|---|---|---|---|---|---|
| | ALTERNATIVE CLUSTER CORRECTIONS | 'able to tach' | 'to tach base' | 'able to tach' | 'to tach base' |
| teach | 15124750 | 103600 | 40 | 0.0068 | 0.000002 |
| touch | 23506900 | 45050 | 27150 | 0.0019 | 0.001154 |

It is noted that for one feature, both the frequency of occurrence and the normalized frequency of occurrence of "teach" are greater than those of "touch", but for another feature, both the frequency of occurrence and the normalized frequency of occurrence of "touch" are greater than those of "teach". In order to make a correct choice of an alternative correction, ratio metrics, described hereinabove with reference to sub-stage IIG, are preferably employed as described hereinbelow.

In this example, the non-contextual similarity scores of the alternative cluster corrections are as indicated in Table 19:

TABLE 19

| ALTERNATIVE CLUSTER CORRECTION | SIMILARITY SCORE |
|---|---|
| teach | 0.94 |
| touch | 0.89 |

It is seen that the reference cluster is "teach", since it has the highest similarity score. Nevertheless "touch" is selected based on the final preference score described hereinabove. This is not intuitive, as may be appreciated from a consideration of the above matrices which indicate that "teach" has the highest frequency of occurrence and the highest normalized frequency of occurrence. In this example, the final preference score indicates a selection of "touch" over "teach" since the ratio of frequencies of occurrence for a feature in which "touch" is favored is much greater than the ratio of frequencies of occurrence for the other feature in which "teach" is favored.

F. Optionally, an alternative correction may be filtered out on the basis of a comparison of frequency function values and preference metrics for that alternative correction and for the reference cluster using one or more of the following decision rules:

1. filtering out an alternative correction having a similarity score below a predetermined threshold and having a CFS frequency function that is less than the CFS frequency function of the reference cluster for at least one feature which has a CFS score which is higher than a predetermined threshold.
 2. filtering out alternative corrections having a similarity score below a predetermined threshold and having a preference metric which is less than a predetermined threshold for at least one feature which has a CFS score which is higher than another predetermined threshold.
 3. a. ascertaining the CFS score of each CFS;
    b. for each CFS, ascertaining the CFS frequency functions for the reference cluster and for an alternative correction, thereby to ascertain whether the reference cluster or the alternative correction has a higher frequency function for that CFS;
    c. summing the CFS scores of CFSs for which the alternative correction has a higher frequency than the reference cluster;
    d. summing the CFS scores of CFSs for which the reference cluster has a higher frequency than the alternative correction; and
    e. if the sum in c. is less than the sum in d. filtering out that alternative correction.

The following example illustrates the filtering functionality described above.

The following input text is provided:
I am fawlling im love
Please note that the spelling mistake "fawlling" was caused by insertion of "w" which is a key proximate to "a" and the spelling mistake "im" is a result of pressing "m" instead of "n", as those are two neighboring keys.

Using the functionality described hereinabove with reference to FIG. 5A, the following cluster is selected for correction:
fawlling im
Using the functionality described hereinabove with reference to FIG. 6, the following alternative cluster corrections are generated (partial list):
falling on; falling in; feeling on; feeling in
Using the functionality described hereinabove with reference to FIG. 4, the following CFSs are generated (partial list):
'am fawlling im'; 'fawning im love'; 'am fawlling im love'; 'I am fawlling im'
Using the functionality described hereinabove with reference to sub-stage IIA herein, the matrix of frequencies of occurrence in an internet corpus seen in Table 20 is generated for the above list of alternative cluster corrections in the above list of CFSs:

TABLE 20

| CFS/ ALTERNATIVE CLUSTER CORRECTIONS | 'am fawlling im' | 'fawlling im love' | 'am fawlling im love' | 'I am fawlling im' |
|---|---|---|---|---|
| falling on | 200 | 40 | 0 | 185 |
| falling in | 4055 | 341800 | 3625 | 3345 |
| feeling on | 435 | 70 | 0 | 370 |
| feeling in | 1035 | 1055 | 0 | 895 |

All CFSs which are entirely included in other CFSs having at least a minimum threshold frequency of occurrence are eliminated. For example the following feature-grams are eliminated:
'am fawlling im'; 'fawlling im love'
In this example the remaining CFSs are the feature-grams:
'am fawlling im love'; 'I am fawlling im'

In this example, the non-contextual similarity scores of the alternative cluster corrections are as indicated in Table 21:

TABLE 21

| ALTERNATIVE CLUSTER CORRECTION | SIMILARITY SCORE |
|---|---|
| falling in | 0.91 |
| falling on | 0.88 |
| feeling in | 0.84 |
| feeling on | 0.81 |

The alternative corrections "falling on", "feeling on" and "feeling in" are filtered out because they have zero frequency of occurrence for one of the CFSs.

G. As discussed hereinabove with reference to Stage III, a ranking is established based on the final preference metric developed as described hereinabove at A-E on the alternative corrections which survive the filtering in F. The alternative correction having the highest final preference score is selected.

H. As discussed hereinabove with reference to Stage IV, a confidence level is assigned to the selected alternative correction. This confidence level is calculated based on one or more of the following parameters:
 a. number, type and scoring of selected CFSs as provided in sub-stage IIB above;
 b. statistical significance of frequency of occurrence of the various alternative cluster corrections, in the context of the CFSs;
 c. degree of consensus on the selection of an alternative correction, based on preference metrics of each of the CFSs and the word similarity scores of the various alternative corrections;
 d. non-contextual similarity score (stage I) of the selected alternative cluster correction being above a predetermined minimum threshold.
 e. extent of contextual data available, as indicated by the number of CFSs in the reduced matrix having CFS scores above a predetermined minimum threshold and having preference scores over another predetermined threshold.

If the confidence level is above a predetermined threshold, the selected alternative correction is implemented without user interaction. If the confidence level is below the predetermined threshold but above a lower predetermined threshold, the selected alternative correction is implemented but user interaction is invited. If the confidence level is below the lower predetermined threshold, user selection based on a prioritized list of alternative corrections is invited.

The following examples are illustrative of the use of confidence level scoring:

The following input text is provided:
  He was not feeling wekk when he returned
  Please note that the spelling mistake "wekk" was caused by proximate key replacement: "l" was replaced by "k" twice.

Using the functionality described hereinabove with reference to FIG. 5A, the following cluster is selected for correction:
  wekk Using the functionality described hereinabove with reference to FIG. 6, the following alternative cluster corrections are generated (partial list):
  week; well Using the functionality described hereinabove with reference to FIG. 4, the following CFSs are generated (partial list): 'was not feeling wekk'; 'not feeling wekk when'; 'feeling wekk when he'; 'wekk when he returned'

Using the functionality described hereinabove with reference to sub-stage IIA herein, the matrix of frequencies of occurrence in an internet corpus seen in Table 22 is generated for the above list of alternative cluster corrections in the above list of CFSs:

TABLE 22

| CFS/ ALTERNATIVE CLUSTER CORRECTIONS | 'was not feeling wekk' | 'not feeling wekk when' | 'feeling wekk when he' | 'wekk when he returned' |
|---|---|---|---|---|
| week | 0 | 0 | 0 | 0 |
| well | 31500 | 520 | 100 | 140 |

The foregoing example illustrates that, according to all the criteria set forth in H above, the selection of 'well' over 'week' has a high confidence level.

In the following example, the confidence level is somewhat less, due to the fact that the alternative correction 'back' has a higher frequency of occurrence than 'beach' in the CFS 'bech in the summer' but 'beach' has a higher frequency of occurrence than 'back' in the CFSs 'on the beech in' and 'the bech in the'. The alternative correction 'beach' is selected with an intermediate confidence level based on criterion H(c).

The following input text is provided:
  I like to work on the bech in the summer
Please note that the spelling mistake "bech" was caused by pressed key omission where the pressing of "a" was not registered in the small keyboard device keypad Using the functionality described hereinabove with reference to FIG. 5A, the following cluster is selected for correction:
  bech Using the functionality described hereinabove with reference to FIG. 6, the following alternative cluster corrections are generated (partial list):
  beach; beech; back Using the functionality described hereinabove with reference to FIG. 4, the following CFSs are generated (partial list):
  'on the bech in'; 'the bech in the'; 'bech in the summer'

Using the functionality described hereinabove with reference to sub-stage IIA, the matrix of frequencies of occurrence in an internet corpus seen in Table 23 is generated for the above list of alternative cluster corrections in the above list of CFSs:

TABLE 23

| CFS/ ALTERNATIVE CLUSTER CORRECTIONS | 'on the bech in' | 'the bech in the' | 'bech in the summer' |
|---|---|---|---|
| Beach | 110560 | 42970 | 2670 |
| Beech | 50 | 55 | 0 |
| Back | 15300 | 10390 | 20090 |

The alternative correction 'beach' is selected with an intermediate confidence level based on criterion H(c).

In the following example, the confidence level is even less, based on criterion H(a):
The following input text is received:
  Expets are what we need now, really . . . .
Please note that the spelling mistake "Expets" was caused by pressed key omission where the pressing of "r" was not registered in the small keyboard device keypad.

Using the functionality described hereinabove with reference to FIG. 5A, the following cluster is selected for correction:

Expets

Using the functionality described hereinabove with reference to FIG. 6, the following alternative cluster corrections are generated (partial list):

Experts; Exerts; Expects

Using the functionality described hereinabove with reference to FIG. 4, the following CFSs are generated (partial list):

'Expets are'; 'Expets are restoring'; 'Expets are restoring the; 'Expets are restoring the British'

Using the functionality described hereinabove with reference to Stage IIA, the matrix of frequencies of occurrence in an internet corpus seen in Table 24 is generated for the above list of alternative cluster corrections in the above list of CFSs:

TABLE 24

| CFS/ ALTERNATIVE CLUSTER CORRECTIONS | 'Expets are' | 'Expets are what' | 'Expets are what we' | 'Expets are what we need' |
|---|---|---|---|---|
| Experts | 62540 | 0 | 0 | 0 |
| Exerts | 140 | 0 | 0 | 0 |
| Expects | 605 | 0 | 0 | 0 |

All CFSs for which all alternative corrections have a zero frequency of occurrence are eliminated. In this example the following feature-grams are eliminated:

'Expets are what; 'Expets are what we; 'Expets are what we need'

In this example the only remaining CFS is the feature-gram:

'Expets are'

As seen from the foregoing example, the only CFS that survives the filtering process is "Expets are". As a result, the confidence level is relatively low, since the selection is based on only a single CFS, which is relatively short and includes, aside from the suspected word, only one word, which is a frequently occurring word.

Figure 9:
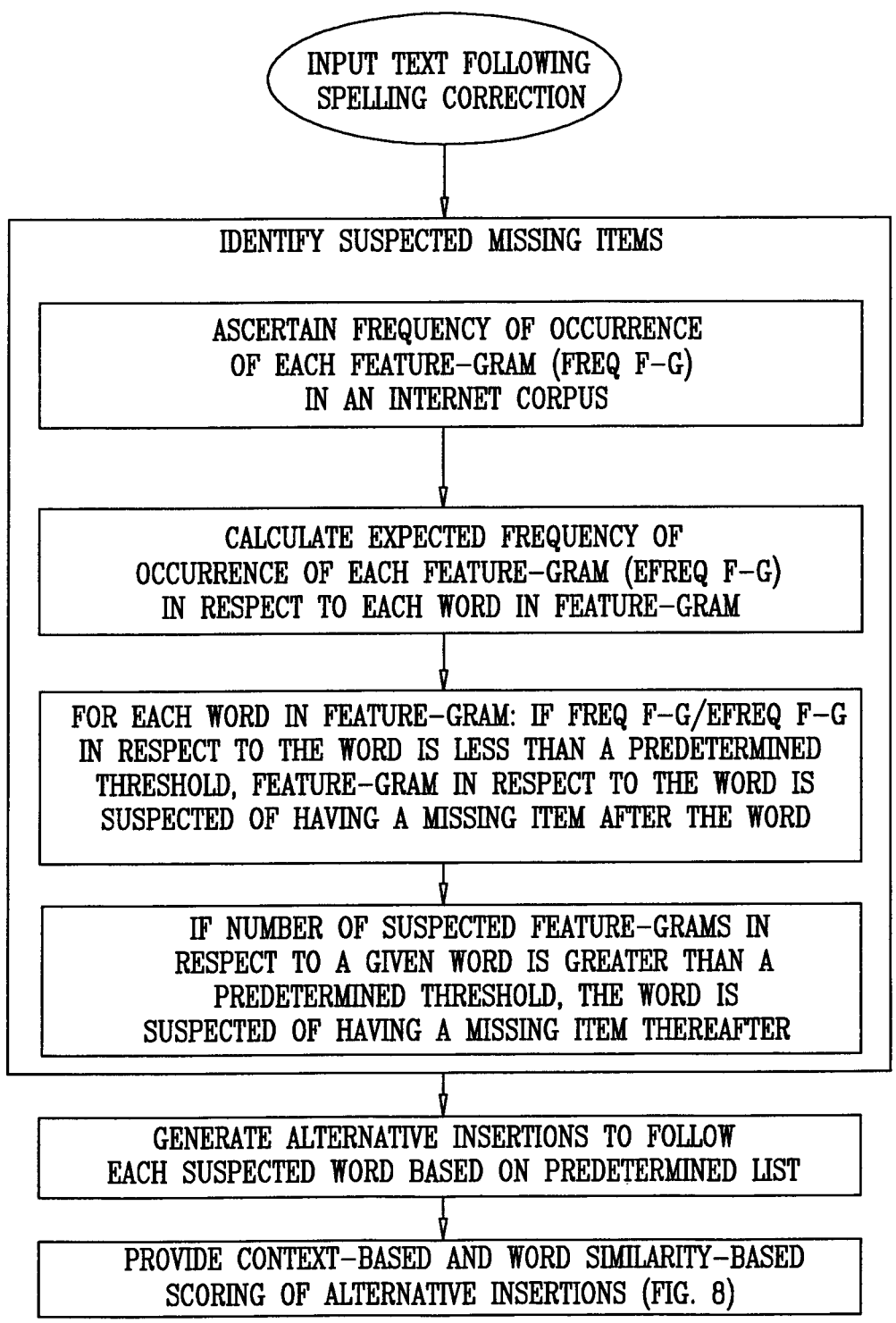
FIG. 9 is a simplified flowchart illustrating the operation of missing article, preposition and punctuation correction functionality.
Figure 10:
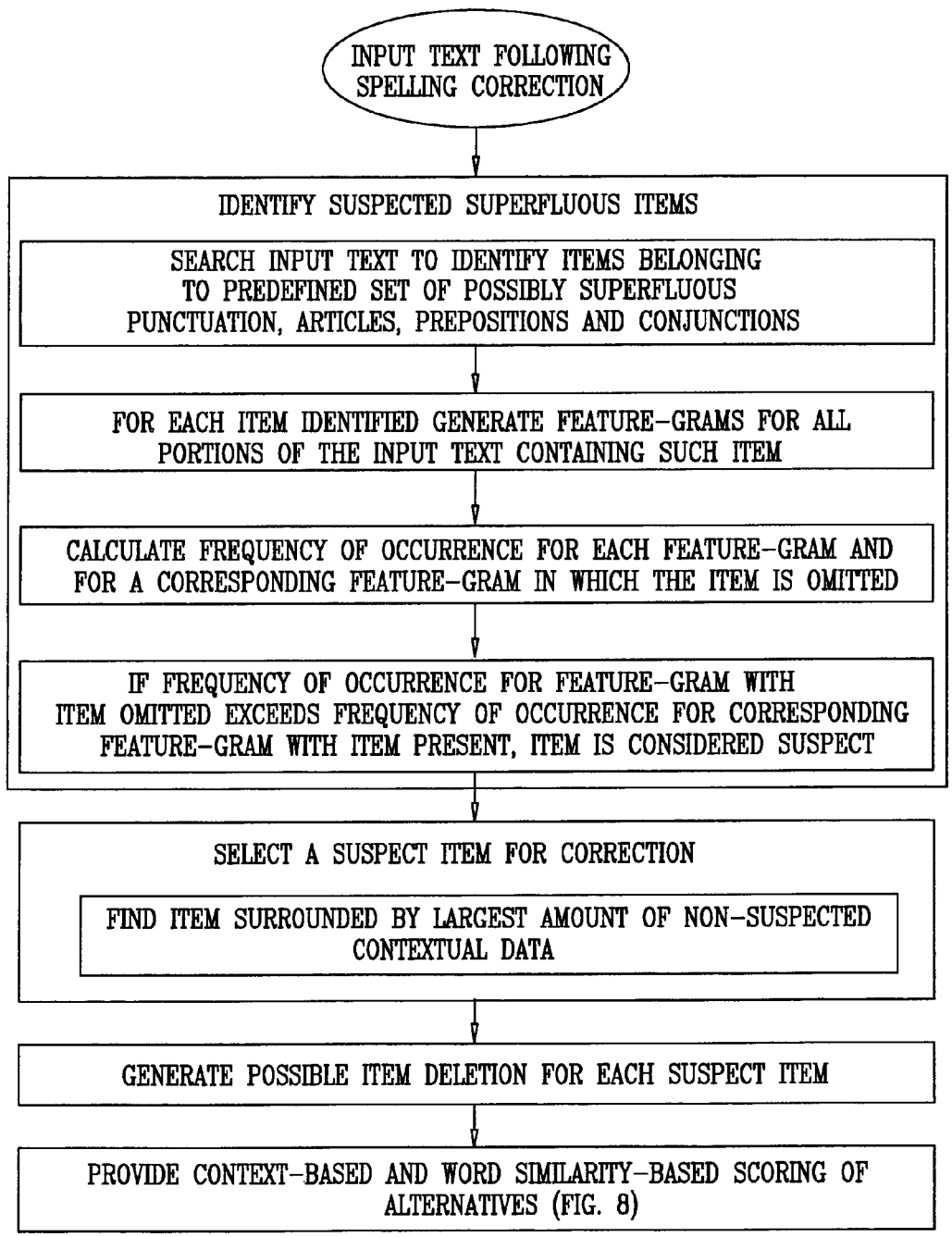
FIG. 10 is a simplified flowchart illustrating the operation of superfluous article, preposition and punctuation correction functionality.

Reference is now made to FIG. 8, which is a simplified flow chart illustrating functionality for context-based and word similarity-based scoring of various alternative corrections useful in the misused word and grammar correction functionality of FIGS. 3, 9 and 10.

As seen in FIG. 8, the context-based and word similarity-based scoring of various alternative corrections proceeds in the following general stages:

I. NON-CONTEXTUAL SCORING—Various cluster alternatives are scored on the basis of similarity to a cluster in the input text in terms of their written appearance and sound similarity. This scoring does not take into account any contextual similarity outside of the given cluster.

II. CONTEXTUAL SCORING USING INTERNET CORPUS—Each of the various cluster alternatives is also scored on the basis of extracted contextual-feature-sequences (CFSs), which are provided as described hereinabove with reference to FIG. 4. This scoring includes the following sub-stages:

IIA. Frequency of occurrence analysis is carried out, preferably using an interne corpus, on the various alternative cluster corrections produced by the functionality of FIG. 6, in the context of the CFSs extracted as described hereinabove in FIG. 4.

IIB. CFS selection and weighting of the various CFSs based on, inter alia, the results of the frequency of occurrence analysis of sub-stage IIA. Weighting is also based on relative inherent importance of various CFSs. It is appreciated that some of the CFSs may be given a weighting of zero and are thus not selected. The selected CFSs preferably are given relative weightings.

IIC. A frequency of occurrence metric is assigned to each alternative correction for each of the selected CFSs in sub-stage JIB.

IID. A reduced set of alternative cluster corrections is generated, based, inter alia, on the results of the frequency of occurrence analysis of sub-stage IIA, the frequency of occurrence metric of sub-stage IIC and the CFS selection and weighting of sub-stage IIB.

IIE. The input cluster is selected for use as a reference cluster correction.

IIF. A frequency of occurrence metric is assigned to the reference cluster correction of sub-stage IIE for each of the selected CFSs in stage IIB.

IIG. A ratio metric is assigned to each of the selected features in sub-stage JIB which represents the ratio of the frequency of occurrence metric for each alternative correction for that feature to the frequency of occurrence metric assigned to the reference cluster of sub-stage IIB.

III A most preferred alternative cluster correction is selected based on the results of stage I and the results of stage II.

IV. A confidence level score is assigned to the most preferred alternative cluster correction.

A more detailed description of the functionality described hereinabove in stages II-IV is presented hereinbelow:

With reference to sub-stage IIA, all of the CFSs which include the cluster to be corrected are generated as described hereinabove in FIG. 4. CFSs containing suspected errors, other than errors in the input cluster, are eliminated.

A matrix is generated indicating the frequency of occurrence in a corpus, preferably an Internet corpus, of each of the alternative corrections for the cluster in each of the CFSs. All CFSs for which all alternative corrections have a zero frequency of occurrence are eliminated. Thereafter, all CFSs which are entirely included in other CFSs having at least a minimum threshold frequency of occurrence are eliminated.

The following example illustrates generation of a frequency of occurrence matrix:

The following input text is provided:

I fid dome research already

Please note that the spelling mistake "fid" was caused by proximate keys replacement of "d" with "f" and the spelling mistake "dome" was caused by proximate keys replacement of "s" with "d".

Using the functionality described hereinabove with reference to FIG. 5B, the following cluster is selected for correction:

fid dome

Using the functionality described hereinabove with reference to FIG. 6, the following alternative cluster corrections are generated (partial list):

feed some; did some; did come; deed dim; pod dime; pod dome

Using the functionality described hereinabove with reference to FIG. 4, the following CFSs are generated (partial list):

'fid dome'; 'I fid dome'; 'fid dome research'; 'I fid dome research'; 'I fid dome research already'

Using the functionality described hereinabove with reference to sub-stage IIA, the matrix of frequencies of occurrence in an internet corpus seen in Table 25 is generated for the above list of alternative cluster corrections in the above list of CFSs:

TABLE 25

| CFS/<br>ALTERNATIVE<br>CLUSTER<br>CORRECTIONS | fid<br>dome | I fid<br>dome | fid<br>dome<br>research | I<br>fid dome<br>research | I fid dome<br>research<br>already |
|---|---|---|---|---|---|
| did some | 1062436 | 336350 | 101445 | 60418 | 0 |
| did come | 234572 | 32104 | 0 | 0 | 0 |
| feed some | 11463 | 145 | 0 | 0 | 0 |
| pod dome | 15 | 0 | 0 | 0 | 0 |
| pod dime | 0 | 0 | 0 | 0 | 0 |
| deed dim | 0 | 0 | 0 | 0 | 0 |

All CFSs for which all alternative corrections have a zero frequency of occurrence are eliminated. In this example the following feature-gram is eliminated:

'I fid dome research already'

Thereafter, all CFSs which are entirely included in other CFSs having at least a minimum threshold frequency of occurrence are eliminated; For example the following feature-grams are eliminated:

'fid dome'; 'I fid dome'; 'fid dome research'

In this example the only remaining CFS is the following feature-gram:

'I fid dome research'

The resulting matrix appears as seen in Table 26:

TABLE 26

| CFS/<br>ALTERNATIVE<br>CLUSTER<br>CORRECTIONS | I<br>fid<br>dome<br>research |
|---|---|
| did some | 60418 |
| did come | 0 |
| feed some | 0 |
| pod dome | 0 |
| pod dime | 0 |
| deed dim | 0 |

The foregoing example illustrates the generation of a matrix in accordance with a preferred embodiment of the present invention. In this example, it is clear that "did some" is the preferred alternative correction. It is to be appreciated that in reality, the choices are not usually so straightforward. Accordingly, in further examples presented below, functionality is provided for making much more difficult choices among alternative corrections.

Returning to a consideration of sub-stage IIB, optionally each of the remaining CFSs is given a score as described hereinabove with reference to FIG. 4. Additionally CFSs which contain words introduced in an earlier correction iteration of the multi-word input and have a confidence level below a predetermined confidence level threshold are negatively biased.

In the general case, similarly to that described hereinabove in sub-stage IIC, preferably, a normalized frequency matrix is generated indicating the normalized frequency of occurrence of each CFS in the internet corpus. The normalized frequency matrix is normally generated from the frequency matrix by dividing each CFS frequency by a function of the frequencies of occurrence of the relevant cluster alternatives.

The normalization is operative to neutralize the effect of substantial differences in overall popularity of various alternative corrections. A suitable normalization factor is based on the overall frequencies of occurrence of various alternative corrections in a corpus as a whole, without regard to CFSs.

The following example illustrates the generation of a normalized frequency of occurrence matrix:

The following input text is provided typically by speech recognition:

Oh, then are you a [decent/docent] or a student?

Using the functionality described hereinabove with reference to FIG. 5B, the following cluster is selected for correction:

decent

Using the functionality described hereinabove with reference to FIG. 6, the following alternative cluster corrections are generated (partial list):

decent; decent; doesn't

Using the functionality described hereinabove with reference to FIG. 4, the following CFSs are generated (partial list):

'a decent'; 'decent or a'

Using the functionality described hereinabove with reference to sub-stage IIC herein, the matrix of frequencies of occurrence and normalized frequencies of occurrence in an internet corpus seen in Table 27 is generated for the above list of alternative cluster corrections in the above list of CFSs:

TABLE 27

| CFS/<br>ALTERNATIVE<br>CLUSTER<br>CORRECTION | FREQUENCY | | | NORMALIZED<br>FREQUENCY | |
|---|---|---|---|---|---|
| | ALTERNATIVE<br>CLUSTER<br>CORRECTION | 'a<br>dwcent' | 'dwcent<br>or a' | 'a dwcent' | 'dwcent<br>or a' |
| docent | 101078 | 23960 | 42 | 0.2370447 | 0.0004155 |
| decent | 8780106 | 2017363 | 114 | 0.2297652 | 0.0000130 |
| doesn't | 45507080 | 1443 | 15 | 0.0000317 | 0.0000003 |

It may be appreciated from the foregoing example that words having the highest frequencies of occurrence may not necessarily have the highest normalized frequencies of occurrence, due to substantial differences in overall popularity of various alternative corrections. In the foregoing example, "docent" has the highest normalized frequencies of occurrence and it is clear from the context of the input text that "docent" is the correct word, rather than "decent" which has higher frequencies of occurrence in the internet corpus.

It is a particular feature of the present invention that normalized frequencies, which neutralize substantial differences in overall popularity of various alternative corrections, are used in selecting among the alternative corrections. It is appreciated that other metrics of frequency of occurrence, other than normalized frequencies of occurrence, may alternatively or additionally be employed as metrics. Where the frequencies of occurrence are relatively low or particularly high, additional or alternative metrics are beneficial.

It will be appreciated from the discussion that follows that additional functionalities are often useful in selecting among various alternative corrections. These functionalities are described hereinbelow.

In sub-stage IID, each alternative cluster correction which is less preferred than another alternative correction according to both of the following metrics is eliminated:
  i. having a word similarity score lower than the other alternative cluster correction; and
  ii. having lower frequencies of occurrences and preferably also lower normalized frequencies of occurrence for all of the CFSs than the other alternative cluster correction.

The following example illustrates the elimination of alternative corrections as described hereinabove:

The following input text is provided:
  I leave on a big house
Please note that the misused mistake "leave" was caused by phonetic replacement of "i" with "ea", and the misused mistake "on" was caused by proximate keys replacement of "i" with "o".

Using the functionality described hereinabove with reference to FIG. 5B, the following cluster is selected for correction:
  leave on Using the functionality described hereinabove with reference to FIG. 6, the following alternative cluster corrections are generated (partial list):
  leave in; live in; love in;

Using the functionality described hereinabove with reference to FIG. 4, the following CFSs are generated (partial list):
  'I leave on a'; 'leave on a big'

Using the functionality described hereinabove with reference to Stage IIE herein, the matrix of frequencies of occurrence and normalized frequencies of occurrence in an internet corpus seen in Table 28 is generated for the above list of alternative cluster corrections in the above list of CFSs:

TABLE 28

| CFS/ ALTERNATIVE CLUSTER CORRECTIONS | FREQUENCY | | | NORMALIZED FREQUENCY | |
|---|---|---|---|---|---|
| | ALTERNATIVE CLUSTER CORRECTION | 'I leave on a' | 'leave on a big' | 'I leave on a' | 'leave on a big' |
| leave in | 442650 | 1700 | 100 | 0.0038 | 0.00022 |
| live in | 15277750 | 266950 | 17800 | 0.0174 | 0.00116 |
| love in | 1023100 | 1880 | 290 | 0.0018 | 0.00028 |
| leave on | 220886 | 1252 | 56 | 0.0056 | 0.0002 |

In this example, the non-contextual similarity scores of the alternative cluster corrections are as indicated in Table 29:

TABLE 29

| ALTERNATIVE CLUSTER CORRECTION | SIMILARITY SCORE |
|---|---|
| leave in | 0.9 |
| live in | 0.8 |
| love in | 0.7 |
| leave on | 1.0 |

The alternative cluster correction "love in" is eliminated as it has a lower similarity score as well as lower frequencies of occurrence and lower normalized frequencies of occurrence than "live in". The alternative cluster correction "leave in" is not eliminated at this stage since its similarity score is higher than that of "live in".

As can be appreciated from the foregoing, the result of operation of the functionality of sub-stage IID is a reduced frequency matrix and preferably also a reduced normalized frequency matrix, indicating the frequency of occurrence and preferably also the normalized frequency of occurrence of each of a reduced plurality of alternative corrections, each of which has a similarity score, for each of a reduced plurality of CFSs. The reduced set of alternative cluster corrections is preferably employed for all further alternative cluster selection functionalities as is seen from the examples which follow hereinbelow.

For each alternative correction in the reduced frequency matrix and preferably also in the reduced normalized frequency matrix, a final preference metric is generated. One or more of the following alternative metrics may be employed to generate a final preference score for each alternative correction:

The term "frequency function" is used below to refer to the frequency, the normalized frequency or a function of both the frequency and the normalized frequency.

A. One possible preference metric is the highest occurrence frequency function for each alternative cluster correction in the reduced matrix or matrices for any of the CFSs in the reduced matrix or matrices. For example, the various alternative cluster corrections would be scored as follows:

The following input text is provided:
  I am vary satisfied with your work

Using the functionality described hereinabove with reference to FIG. 5B, the following cluster is selected for correction:
  vary Using the functionality described hereinabove with reference to FIG. 6, the following alternative cluster corrections are generated (partial list):
  vary; very Using the functionality described hereinabove with reference to FIG. 4, the following CFSs are generated (partial list):
  'am vary'; 'vary satisfied'; 'I am vary satisfied with'

Using the functionality described hereinabove with reference to sub-stage IIC herein, the matrix of frequencies of occurrence and normalized frequencies of occurrence in an internet corpus seen in Tables 30 and 31 is generated for the above list of alternative cluster corrections in the above list of CFSs:

TABLE 30

| CFS/ ALTERNATIVE CLUSTER CORRECTIONS | FREQUENCY | | | |
|---|---|---|---|---|
| | ALTERNATIVE CLUSTER CORRECTION | 'am vary' | 'vary satisfied' | 'I am vary satisfied with' |
| Vary | 20247200 | 800 | 70 | 0 |
| Very | 292898000 | 3123500 | 422700 | 30750 |

TABLE 31

| CFS/ ALTERNATIVE CLUSTER CORRECTIONS | NORMALIZED FREQUENCY | | |
|---|---|---|---|
| | 'am vary' | 'vary satisfied' | 'I am vary satisfied with' |
| Vary | 0.000039 | 0.000003 | 0 |
| Very | 0.010664 | 0.001443 | 0.000105 |

It is seen that in this example both from frequency of occurrence and normalized frequency of occurrence, "very" has the highest occurrence frequency function.

B. Another possible preference metric is the average occurrence frequency function of all CFSs for each alternative correction. For example, the various alternative corrections would be scored as follows:

The following input text is provided:

A while ago the lived 3 dwarfs

Using the functionality described hereinabove with reference to FIG. 5B, the following cluster is selected for correction:

the

Using the functionality described hereinabove with reference to FIG. 6, the following alternative cluster corrections are generated (partial list):

the; they; she; there

Using the functionality described hereinabove with reference to FIG. 4, the following CFSs are generated (partial list):

'ago the lived'; 'the lived 3'

Using the functionality described hereinabove with reference to sub-stage IIC herein, the matrix of frequencies of occurrence, normalized frequencies of occurrence and average frequency of occurrence in an internet corpus seen in Tables 32 and 33 is generated for the above list of alternative cluster corrections in the above list of CFSs:

TABLE 32

| CFS/ ALTERNATIVE CLUSTER CORRECTIONS | FREQUENCY | | |
|---|---|---|---|
| | ALTERNATIVE CLUSTER CORRECTIONS | 'ago the lived' | 'the lived 3' |
| The | 19401194700 | 0 | 0 |
| They | 702221530 | 300 | 45 |
| She | 234969160 | 215 | 65 |
| there | 478280320 | 3200 | 40 |

TABLE 33

| CFS/ ALTERNATIVE CLUSTER CORRECTIONS | NORMALIZED FREQUENCY | | AVERAGE Average |
|---|---|---|---|
| | 'ago the lived' | 'the lived 3' | frequency of occurrence |
| The | 0 | 0 | 0 |
| They | 0.0000004 | 0.00000006 | 172 |
| She | 0.0000009 | 0.00000027 | 140 |
| there | 0.0000066 | 0.00000008 | 1620 |

It is noted that "they" is selected based on the average frequency of occurrence, notwithstanding that "there" has a CFS whose frequency of occurrence is the maximum frequency of occurrence in the matrix.

In this example, the non-contextual similarity scores of the alternative cluster corrections are as indicated in Table 34:

TABLE 34

| ALTERNATIVE CLUSTER CORRECTION | SIMILARITY SCORE |
|---|---|
| the | 1.00 |
| they | 0.86 |
| she | 0.76 |
| there | 0.67 |

It is noted that the alternative cluster correction having the highest similarity score is not selected.

C. A further possible preference metric is the weighted sum over all CFSs for each alternative correction of the occurrence frequency function for each CFS multiplied by the score of that CFS as computed by the functionality described hereinabove with reference to FIG. 4.

D. A Specific Alternative Correction/CFS preference metric, is generated, as described hereinabove with reference to sub-stages IIE-IIG, by any one or more, and more preferably most and most preferably all of the following operations on the alternative corrections in the reduced matrix or matrices:

i. The cluster from the original input text that is selected for correction is selected to be the reference cluster.

ii. A modified matrix is produced wherein in each preference matrix, the occurrence frequency function of each alternative correction in each feature gram is replaced by the ratio of the occurrence frequency function of each alternative correction to the occurrence frequency function of the reference cluster.

iii. A modified matrix of the type described hereinabove in ii. is further modified to replace the ratio in each preference metric by a function of the ratio which function reduces the computational importance of very large differences in ratios. A suitable such function is a logarithmic function. The purpose of this operation is to de-emphasize the importance of large differences in frequencies of occurrence in the final preference scoring of the most preferred alternative corrections, while maintaining the importance of large differences in frequencies of occurrence in the final preference scoring, and thus elimination, of the least preferred alternative corrections.

iv. A modified matrix of the type described hereinabove in ii or iii is additionally modified by multiplying the applicable ratio or function of ratio in each preference metric by the appropriate CFS score. This provides emphasis based on correct grammatical usage and other factors which are reflected in the CFS score.

v. A modified matrix of the type described hereinabove in ii, iii or iv is additionally modified by multiplying the applicable ratio or function of ratio in each preference metric by a function of a user uncertainty metric. Some examples of a user input uncertainty metric include the number of edit actions related to an input word or cluster performed in a word processor, vis-à-vis edit actions on other words of the document; the timing of writing of an input word or cluster performed in a word processor, vis-à-vis time of writing of other words of the document and the timing of speaking of an input word or cluster performed in a speech recognition input functionality, vis-à-vis time of speaking of other words by this user. The user input uncertainty metric provides an indication of how certain the user was of this choice of words. This step takes the computed bias to a reference cluster and modifies it by a function of the user's certainty or uncertainty regarding this cluster.

vi. A modified matrix of the type described hereinabove in ii, iii, iv or v is additionally modified by generating a function of the applicable ratio, function of ratio, frequency of occurrence and normalized frequency of occurrence. A preferred function is generated by multiplying the applicable ratio or function of ratio in each preference metric by the frequency of occurrence of that CFS.

E. A final preference metric is computed for each alternative correction based on the Specific Alternative Correction/CFS preference metric as described hereinabove in D by multiplying the similarity score of the alternative correction by the sum of the Specific Alternative Correction/CFS preference metrics for all CFS for that Alternative Correction.

An example of such modified matrix is as follows:
The following input text is provided:
I will be able to teach base with you next week Using the functionality described hereinabove with reference to FIG. 5B, the following cluster is selected for correction:
teach Using the functionality described hereinabove with reference to FIG. 6, the following alternative cluster corrections are generated (partial list):
teach; touch Using the functionality described hereinabove with reference to FIG. 4, the following CFSs are generated (partial list):
'able to teach'; 'to teach base'

Using the functionality described hereinabove with reference to sub-stages IIA & IIC hereinabove, the matrix of frequencies of occurrence and normalized frequencies of occurrence in an internet corpus seen in Table 35 is generated for the above list of alternative cluster corrections in the above list of CFSs:

TABLE 35

| CFS/ ALTERNATIVE CLUSTER CORRECTIONS | FREQUENCY ALTERNATIVE CLUSTER CORRECTION | 'able to teach' | 'to teach base' | NORMALIZED FREQUENCY 'able to teach' | 'to teach base' |
|---|---|---|---|---|---|
| Teach | 15124750 | 103600 | 40 | 0.00684 | 0.000002 |
| touch | 23506900 | 45050 | 27150 | 0.00191 | 0.001154 |

It is noted that for one feature, both the frequency of occurrence and the normalized frequency of occurrence of "teach" are greater than those of "touch", but for another feature, both the frequency of occurrence and the normalized frequency of occurrence of "touch" are greater than those of "teach". In order to make a correct choice of an alternative correction, ratio metrics, described hereinabove with reference to sub-stage IIG, are preferably employed as described hereinbelow.

In this example, the non-contextual similarity scores of the alternative cluster corrections are as indicated in Table 36:

TABLE 36

| ALTERNATIVE CLUSTER CORRECTION | SIMILARITY SCORE |
|---|---|
| Teach | 1.00 |
| touch | 0.89 |

It is seen that the reference cluster is "teach", since it has the highest similarity score. Nevertheless "touch" is selected based on the final preference score described hereinabove. This is not intuitive as may be appreciated from a consideration of the above matrices which indicate that "teach" has the highest frequency of occurrence and the highest normalized frequency of occurrence. In this example, the final preference score indicates a selection of "touch" over "teach" since the ratio of frequencies of occurrence for a feature in which "touch" is favored is much greater than the ratio of frequencies of occurrence for the other feature in which "teach" is favored.

F. Optionally, an alternative correction may be filtered out on the basis of a comparison of frequency function values and preference metrics for that alternative correction and for the reference cluster using one or more of the following decision rules:

1. filtering out an alternative correction having a similarity score below a predetermined threshold and having a CFS frequency function that is less than the CFS frequency function of the reference cluster for at least one feature which has a CFS score which is higher than a predetermined threshold.

2. filtering out alternative corrections having a similarity score below a predetermined threshold and having a preference metric which is less than a predetermined threshold for at least one feature which has a CFS score which is higher than another predetermined threshold.

3. a. ascertaining the CFS score of each CFS;
   b. for each CFS, ascertaining the CFS frequency functions for the reference cluster and for an alternative correction, thereby to ascertain whether the reference cluster or the alternative correction has a higher frequency function for that CFS;
   c. summing the CFS scores of CFSs for which the alternative correction has a higher frequency than the reference cluster;
   d. summing the CFS scores of CFSs for which the reference cluster has a higher frequency than the alternative correction;

e. if the sum in c. is less than the sum in d. filtering out that alternative correction.

The following example illustrates the filtering functionality described above.

The following input text is provided, typically by speech recognition functionality:

I want [two/to/too] items, please.

Using the functionality described hereinabove with reference to FIG. 5B, the following cluster is selected for correction:

[two/to/too]

Using the functionality described hereinabove with reference to FIG. 6, the following alternative cluster corrections are generated (partial list):

too; to; two

Using the functionality described hereinabove with reference to FIG. 4, the following CFSs are generated (partial list):

'I want two'; 'want two items'

Using the functionality described hereinabove with reference to Stage IIA herein, the matrix of frequencies of occurrence in an internet corpus seen in Table 37 is generated for the above list of alternative cluster corrections in the above list of CFSs:

TABLE 37

| CFS/ ALTERNATIVE CLUSTER CORRECTIONS | 'I want two' | 'want two items' |
|---|---|---|
| Too | 9900 | 0 |
| To | 18286300 | 0 |
| two | 8450 | 140 |

The alternative corrections "too" and "to" are filtered out because they have zero frequency of occurrence for one of the CFSs, notwithstanding that they have high frequencies of occurrence of another CFS. Thus here, the only surviving CFS is "two".

G. As discussed hereinabove with reference to Stage III, a ranking is established based on the final preference metric developed as described hereinabove at A-E on the alternative corrections which survive the filtering in F. The alternative correction having the highest final preference score is selected.

H. As discussed hereinabove with reference to Stage IV, a confidence level is assigned to the selected alternative correction. This confidence level is calculated based on one or more of the following parameters:

a. number, type and scoring of selected CFSs as provided in sub-stage IIB above;

b. statistical significance of frequency of occurrence of the various alternative cluster corrections, in the context of the CFSs;

c. degree of consensus on the selection of an alternative correction, based on preference metrics of each of the CFSs and the word similarity scores of the various alternative corrections;

d. non-contextual similarity score (stage I) of the selected alternative cluster correction being above a predetermined minimum threshold.

e. extent of contextual data available, as indicated by the number of CFSs in the reduced matrix having CFS scores above a predetermined minimum threshold and having preference scores over another predetermined threshold.

If the confidence level is above a predetermined threshold, the selected alternative correction is implemented without user interaction. If the confidence level is below the predetermined threshold but above a lower predetermined threshold, the selected alternative correction is implemented but user interaction is invited. If the confidence level is below the lower predetermined threshold, user selection based on a prioritized list of alternative corrections is invited.

The following examples are illustrative of the use of confidence level scoring:

The following input text is provided:

He was not feeling wale when he returned

Using the functionality described hereinabove with reference to FIG. 5B, the following cluster is selected for correction:

wale

Using the functionality described hereinabove with reference to FIG. 6, the following alternative cluster corrections are generated (partial list):

wale; well

Using the functionality described hereinabove with reference to FIG. 4, the following CFSs are generated (partial list):

'was not feeling wale'; 'not feeling wale when'; 'feeling wale when he'; 'wale when he returned'

Using the functionality described hereinabove with reference to sub-stage IIA herein, the matrix of frequencies of occurrence in an internet corpus seen in Table 38 is generated for the above list of alternative cluster corrections in the above list of CFSs:

TABLE 38

| CFS/ ALTERNATIVE CLUSTER CORRECTIONS | 'was not feeling wale' | 'not feeling wale when' | 'feeling wale when he' | 'wale when he returned' |
|---|---|---|---|---|
| Wale | 0 | 0 | 0 | 0 |
| Well | 31500 | 520 | 100 | 140 |

The foregoing example illustrates that, according to all the criteria set forth in H above, the selection of 'well' over 'wale' has a high confidence level.

In the following example, the confidence level is somewhat less, due to the fact that the alternative correction 'back' has a higher frequency of occurrence than 'beach' in the CFS 'beech in the summer' but 'beach' has a higher frequency of occurrence than 'back' in the CFSs 'on the beech in' and 'the beech in the'. The alternative correction 'beach' is selected with an intermediate confidence level based on criterion H(c).

The following input text is provided:

I like to work on the beech in the summer

Using the functionality described hereinabove with reference to FIG. 5B, the following cluster is selected for correction:

beech

Using the functionality described hereinabove with reference to FIG. 6, the following alternative cluster corrections are generated (partial list):

beach; beech; back

Using the functionality described hereinabove with reference to FIG. 4, the following CFSs are generated (partial list):

'on the beech in'; 'the beech in the'; 'beech in the summer'

Using the functionality described hereinabove with reference to Stage IIA, the matrix of frequencies of occurrence in an internet corpus seen in Table 39 is generated for the above list of alternative cluster corrections in the above list of CFSs:

TABLE 39

| CFS/ ALTERNATIVE CLUSTER CORRECTIONS | 'on the beech in' | 'the beech in the' | 'beech in the summer' |
|---|---|---|---|
| Beach | 110560 | 42970 | 2670 |
| Beech | 50 | 55 | 0 |
| Back | 15300 | 10390 | 20090 |

The alternative correction 'beach' is selected with an intermediate confidence level based on criterion H(c).

In the following example, the confidence level is even less, based on criterion H(a):

The following input text is received:

Exerts are restoring the British Museum's round reading room

Using the functionality described hereinabove with reference to FIG. 5B, the following cluster is selected for correction:

Exerts

Using the functionality described hereinabove with reference to FIG. 6, the following alternative cluster corrections are generated (partial list):

Expert; Exerts; Expects

Using the functionality described hereinabove with reference to FIG. 4, the following CFSs are generated (partial list):

'Exerts are'; 'Exerts are restoring'; 'Exerts are restoring the'; 'Exerts are restoring the British'

Using the functionality described hereinabove with reference to sub-stage IIA, the matrix of frequencies of occurrence in an internet corpus seen in Table 40 is generated for the above list of alternative cluster corrections in the above list of CFSs:

TABLE 40

| CFS/ ALTERNATIVE CLUSTER CORRECTIONS | 'Exerts are' | 'Exerts are restoring' | 'Exerts are restoring the' | 'Exerts are restoring the British' |
|---|---|---|---|---|
| Experts | 62540 | 0 | 0 | 0 |
| Exerts | 140 | 0 | 0 | 0 |
| Exists | 8225 | 0 | 0 | 0 |

All CFSs for which all alternative corrections have a zero frequency of occurrence are eliminated. In this example the following feature-grams are eliminated:

'Exerts are restoring'; 'Exerts are restoring the'; 'Exerts are restoring the British'

In this example the only remaining CFS is the feature-gram:

'Exerts are'

As seen from the foregoing example, the only CFS that survives the filtering process is 'Exerts are'. As a result, the confidence level is relatively low, since the selection is based on only a single CFS, which is relatively short and includes, aside from the suspected word, only one word, which is a frequently occurring word.

The following example illustrates the usage of the final preference score metric described in stages D & E above.

The following input text is provided:

Some kids don't do any sport and sit around doing nothing and getting fast so you will burn some calories and get a lot fitter if you exercise.

Using the functionality described hereinabove with reference to FIG. 5B, the following cluster is selected for correction:

fast

Using the functionality described hereinabove with reference to FIG. 6, the following alternative cluster corrections are generated (partial list):

fat; fast

Using the functionality described hereinabove with reference to FIG. 4, the following CFSs are generated (partial list):

'and getting fast'; 'getting fast so'; 'fast so you'; 'fast so you will'

Using the functionality described hereinabove with reference to sub-stage IIA herein, the matrix of frequencies of occurrence in an internet corpus seen in Table 41 is generated for the above list of alternative cluster corrections in the above list of CFSs:

TABLE 41

| CFS/ ALTERNATIVE CLUSTER CORRECTIONS | 'and getting fast' | 'getting fast so' | 'fast so you' | 'fast so you will' |
|---|---|---|---|---|
| CFS IMPORTANCE SCORE | 0.8 | 0.8 | 0.05 | 0.2 |
| Fast | 280 | 20 | 6500 | 250 |
| Fat | 1960 | 100 | 1070 | 115 |

In this example, the non-contextual similarity scores of the alternative cluster corrections are as indicated in Table 42:

TABLE 42

| ALTERNATIVE CLUSTER CORRECTION | SIMILARITY SCORE |
|---|---|
| fast | 1 |
| fat | 0.89 |

Using the final preference score metric described in stages D & E above, the alternative correction "fat" is selected with low confidence.

Reference is now made to FIG. 9, which is a detailed flowchart illustrating the operation of missing item correction functionality. The missing item correction functionality is operative to correct for missing articles, prepositions, punctuation and other items having principally grammatical functions in an input text. This functionality preferably operates on a spelling-corrected input text output from the spelling correction functionality of FIG. 1.

Identification of suspected missing items is carried out preferably in the following manner:

Initially, feature-grams are generated for a spelling-corrected input text. The frequency of occurrence of each feature-gram in the spelling-corrected input text in a corpus, preferably an internet corpus (FREQ F-G), is ascertained.

An expected frequency of occurrence of each feature-gram (EFREQ F-G) is calculated as follows:

A feature-gram is assumed to contain n words, identified as $W_1$–$W_n$.

$W_i$ designates the i'th word in the feature-gram

An expected frequency of occurrence of a given feature-gram is taken to be the highest of expected frequencies of that feature-gram based on division of the words in the feature-gram into two consecutive parts following each of the words $W_1 \ldots W_{(n-1)}$.

The expected frequency of a feature-gram based on division of the words in the feature-gram into two consecutive parts following a word W, can be expressed as follows:

EFREQ F-G in respect of $W_i$=(FREQ($W_1$-$W_i$)*FREQ($W_{i+1}$-$W_n$))/(TOTAL OF FREQUENCIES OF ALL WORDS IN THE CORPUS)

The expected frequencies of each feature-gram based on all possible divisions of the words in the feature-gram into two consecutive parts are calculated.

If FREQ F-G/EFREQ F-G in respect of $W_i$ is less than a predetermined threshold, the feature-gram in respect of $W_i$ is considered to be suspect in terms of there being a missing article, preposition or punctuation between $W_i$ and $W_{i+1}$ in that feature gram.

A suspect word junction between two consecutive words in a spelling-corrected input text is selected for correction, preferably by attempting to find the word junction which is surrounded by the largest amount of non-suspected contextual data. Preferably, the word junction that has the longest sequence or sequences of non-suspected word junctions in its vicinity is selected.

One or, preferably, more alternative insertions is generated for each word junction, preferably based on a predefined set of possibly missing punctuation, articles, prepositions, conjunctions or other items, which normally do not include nouns, verbs or adjectives.

At least partially context-based and word similarity-based scoring of the various alternative insertions is provided, preferably based on a correction alternatives scoring algorithm, described hereinabove with reference to FIG. 8 and hereinbelow.

The following example is illustrative:

The following input text is provided:

I can't read please help me

Using the functionality described hereinabove with reference to FIG. 4, the following feature-grams are generated (partial list):

I can't read; can't read please; read please help; please help me

Using the functionality described hereinabove, a matrix of the frequencies of occurrence in an internet corpus is generated for the above list of feature-grams which typically appears as seen in Table 43:

TABLE 43

| FEATURE-GRAM | FREQUENCY OF OCCURRENCE |
|---|---|
| I can't read | 5600 |
| can't read please | 0 |
| read please help | 55 |
| please help me | 441185 |

The expected frequency of occurrence is calculated for each feature-gram in respect of each word $W_i$ in the feature-gram, in accordance with the following expression:

EFREQ F-G in respect of $W_i$=(FREQ($W_1$-$W_i$)*FREQ($W_{i+1}$-$W_n$))/(TOTAL OF FREQUENCIES OF ALL WORDS IN THE CORPUS)

The exemplary results of some of these calculations are seen in Tables 44 and 45:

TABLE 44

| FEATURE-GRAM | FREQUENCY OF OCCURRENCE | EXPECTED FREQUENCY OF OCCURRENCE WITH RESPECT TO "read" | FREQ F-G in respect of "read"/EFREQ F-G in respect of "read" |
|---|---|---|---|
| can't read please | 0 | 0 | 0 |
| read please help | 55 | 220 | 0.25 |

TABLE 45

| FEATURE-GRAM | FREQUENCY OF OCCURRENCE |
|---|---|
| read | 157996585 |
| please help | 1391300 |

As seen from the above results, the actual frequency of occurrence of each of the feature-grams is less than the expected frequency of occurrence thereof. This indicates suspected absence of an item, such as punctuation.

A list of alternative insertions to follow the word "read" is generated. This list preferably includes a predetermined list of punctuation, articles, conjunctions and prepositions. Specifically, it will include a period ".".

A partial list of the alternatives is:

'read please'; 'read. Please'; 'read of please'; 'read a please'

Using the functionality described hereinabove with reference to FIG. 4, the following CFSs are generated:

'I can't read [?]'; 'read [?] please help'; '[?] please help me'

Using the functionality described in stage IIA of FIG. 8, the matrix of frequencies of occurrence in an internet corpus seen in Table 46 is generated for the above list of alternative cluster corrections in the above list of CFSs:

When a '.' is included in a cluster, the CFS frequency of occurrence that includes the cluster with the is retrieved separately for the text before and after the '.' i.e., the feature-gram "can't read. Please" will not be generated because it includes two separate grammar parsing phrases.

TABLE 46

| CFS/ ALTERNATIVE CLUSTER CORRECTIONS | 'can't read [?]' | 'read [?] please help' | '[?] please help me' |
|---|---|---|---|
| read please | 0 | 0 | 0 |
| read. Please | 1093 | 0 | 357945* |
| read of please | 0 | 0 | 0 |
| read a please | 0 | 0 | 0 |

*Note:
A '.' is omitted from the beginning of a feature gram when calculating its frequency of occurrence in the corpus. For example, the frequency of ". Please help me" is identical to the frequency of "Please help me".

Using the functionality described in stages D & E of FIG. 8 the final preference metric selects the alternative correction "read. Please" and the corrected input text is:

I can't read. Please help me.

The following example illustrates the functionality of adding a missing preposition.

The following input text is provided:

I sit the sofa

Using the functionality described hereinbelow, the following cluster is selected for correction:

'sit the'

Using the functionality described hereinbelow, the following alternative cluster corrections are generated (partial list):

sit on the; sit of the; sit the

Using the functionality described hereinabove with reference, to FIG. 4, the following CFSs are generated:

'I sit the'; 'sit the sofa'

Using the functionality described in stage IIA with reference to FIG. 8, the matrix of frequencies of occurrence in an internet corpus seen in Table 47 is generated for the above list of alternative cluster corrections in the above list of CFSs:

TABLE 47

| CFS/ ALTERNATIVE CLUSTER CORRECTIONS | 'I sit [?] the' | 'sit [?] the sofa' |
|---|---|---|
| sit on the | 26370 | 7400 |
| sit of the | 0 | 0 |
| sit the | 2100 | 0 |

Using the functionality described in stages IID & TIE of FIG. 8 the final preference metric selects the alternative correction "sit on the" and the corrected input text is:

I sit on the sofa.

Reference is now made to FIG. 10, which is a detailed flowchart illustrating the operation of superfluous item correction functionality. The superfluous item correction functionality is operative to correct for superfluous articles, prepositions, punctuation and other items having principally grammatical functions in an input text. This functionality preferably operates on a spelling-corrected input text output from the spelling correction functionality of FIG. 1.

It is appreciated that the functionality of FIG. 10 may be combined with the functionality of FIG. 9 or alternatively carried out in parallel therewith, prior thereto or following operation thereof.

Identification of suspected superfluous items is carried out preferably in the following manner:

A search is carried out on the spelling-corrected input text to identify items belonging to a predefined set of possibly superfluous punctuation, articles, prepositions, conjunctions and other items, which normally do not include nouns, verbs or adjectives.

For each such item, feature-grams are generated for all portions of the misused-word and grammar corrected, spelling-corrected input text containing such item. A frequency of occurrence is calculated for each such feature-gram and for a corresponding feature-gram in which the item is omitted.

If the frequency of occurrence for the feature-gram in which the item is omitted exceeds the frequency of occurrence for the corresponding feature-gram in which the item is present, the item is considered as suspect.

A suspect item in a misused-word and grammar corrected, spelling-corrected input text is selected for correction, preferably by attempting to find the item which is surrounded by the largest amount of non-suspected contextual data. Preferably, the item that has the longest sequence or sequences of non-suspected words in its vicinity is selected.

A possible item deletion is generated for each suspect item. At least partially context-based and word similarity-based scoring of the various alternatives, i.e. deletion of the item or non-deletion of the item, is provided, preferably based on a correction alternatives scoring algorithm, described hereinabove with reference to FIG. 8 and hereinbelow.

The following example is illustrative.

The following input text is provided:

It is a nice, thing to wear.

The input text is searched to identify any items which belong to a predetermined list of commonly superfluous items, such as, for example, punctuation, prepositions, conjunctions and articles.

In this example, the comma "," is identified as belonging to such a list.

Using the functionality described hereinabove with reference to FIG. 4, the feature-grams, seen in Table 48, which include a comma "," are generated and identical feature-grams without the comma are also generated (partial list):

TABLE 48

| FEATURE-GRAM WITH COMMA | FEATURE-GRAM WITHOUT COMMA |
|---|---|
| is a nice, thing | is a nice thing |
| a nice, thing to | a nice thing to |
| nice, thing to wear | nice thing to wear |

Using the functionality described hereinabove, a matrix of the frequencies of occurrence in an internet corpus is generated for the above list of feature-grams which typically appears as seen in Table 49:

TABLE 49

| FEATURE-GRAM WITH COMMA | FREQUENCY OF OCCURRENCE OF FEATURE-GRAM WITH COMMA | FEATURE-GRAM WITHOUT COMMA | FREQUENCY OF OCCURRENCE OF FEATURE-GRAM WITHOUT COMMA |
|---|---|---|---|
| is a nice, thing | 0 | is a nice thing | 10900 |
| a nice, thing to | 0 | a nice thing to | 39165 |
| nice, thing to wear | 0 | nice thing to wear | 100 |

As seen in the matrix above, the frequency of occurrence for the feature grams with the "," omitted exceeds the frequency of occurrence for corresponding feature grams with the "," present. Therefore, the "," is considered as suspect of being superfluous.

The possible deletion of the comma is considered, based on context based scoring of the following alternatives of keeping the comma and omitting the comma:

'nice,'; 'nice'

Using the functionality described hereinabove with reference to FIG. 4, the following CFSs are generated (partial list):

'a nice,'; 'nice, thing'; 'is a nice,'; 'a nice, thing'; 'nice, thing to'

Using the functionality described hereinabove with reference to FIG. 8 Stage IIA, the matrix of frequencies of occurrence in an internet corpus seen in Table 50 is generated for the above list of alternative cluster corrections in the above list of CFSs:

TABLE 50

| CFS/<br>ALTERNATIVE<br>CLUSTER<br>CORRECTIONS | 'a nice,' | 'nice,<br>thing' | 'is a<br>nice,' | 'a nice,<br>thing' | 'nice,<br>thing to' |
|---|---|---|---|---|---|
| nice, | 379400 | 0 | 37790 | 0 | 0 |
| Nice | 11809290 | 300675 | 1127040 | 69100 | 58630 |

All CFSs which are entirely included in other CFSs having at least a minimum threshold frequency of occurrence are eliminated. For example the following feature-grams are eliminated:

'a nice,'; 'nice, thing'

In this example the remaining CFSs are the feature-grams:

'is a nice,'; 'a nice, thing'; 'nice, thing to'

Using the final preference score described in stages D & E of FIG. 8 above, the alternative correction "nice", without the comma, is selected. The input text after the comma deletion is:

It is a nice thing to wear.

The following example illustrates the functionality of removing a superfluous article.

The following input text is provided:

We should provide them a food and water.

Using the functionality described hereinabove with reference to FIG. 10, the following cluster is selected for correction:

a food

Using the functionality described hereinabove with reference to FIG. 10, the following alternative cluster corrections are generated (partial list):

a food; food

Using the functionality described hereinabove with reference to FIG. 4, the following CFSs are generated (partial list):

'provide them a food'; 'them a food and'; 'a food and water'

Using the functionality described hereinabove with reference to sub-stage IIA herein, the matrix of frequencies of occurrence in an internet corpus seen in Table 51 is generated for the above list of alternative cluster corrections in the above list of CFSs:

TABLE 51

| CFS/<br>ALTERNATIVE<br>CLUSTER CORRECTIONS | 'provide<br>them a food' | 'them a<br>food and' | 'a food and<br>water' |
|---|---|---|---|
| a food | 0 | 0 | 950 |
| Food | 790 | 12775 | 415620 |

Using the scoring functionality described in FIG. 8, the final preference metric selects the alternative correction "food" and the corrected input text is:

We should provide them food and water.

It will be appreciated by persons skilled in the art that the present invention is not limited to what has been particularly shown and described hereinabove. Rather the scope of the present invention includes both combinations and sub-combinations of the various features described and shown hereinabove and modifications thereof which will occur to persons skilled in the art upon reading the foregoing description and which are not in the prior art.

The invention claimed is:

1. A computer-assisted language correction system comprising:
    contextual feature-sequence (CFS) functionality operative to generate a plurality of contextual feature-sequences based on an input sentence, said contextual feature sequences comprising at least one of N-grams, skip-grams, switch-grams, co-occurrences, and combinations thereof;
    an alternatives generator, generating on the basis of said input sentence a text-based representation providing multiple alternatives for each of a plurality of words in the sentence, said multiple alternatives including non-contextual corrections for each of said plurality of words, said multiple alternatives including alternatives based on keyboard keys location proximity;
    a selector for selecting among at least said multiple alternatives for each of said plurality of words in the sentence, said selector including context based scoring functionality operative to rank said multiple alternatives, based at least partly on contextual feature-sequence frequencies of occurrences in an internet corpus, for each of the plurality of contextual feature-sequences, said context based scoring functionality including ranking said multiple alternatives based at least partially on a CFS importance score, said CFS importance score being a function of a combination of a) a number of parsing tree nodes that correspond to a same part of the CFS and b) a frequency of occurrence of each of the words in the CFS; and
    a correction generator operative to provide a correction output based on selections made by said selector.

2. A computer-assisted language correction system according to claim 1 wherein said selector is operative to make said selections based on at least one of the following correction functions:
    spelling correction;
    misused word correction; and
    grammar correction.

3. A computer-assisted language correction system according to claim 1 wherein said selector is operative to make said selections based on at least two of the following correction functions:
    spelling correction;
    misused word correction; and
    grammar correction.

4. A computer-assisted language correction system according to claim 3 and wherein said selector is operative to make said selections based on at least one of the following time ordering of corrections:
    spelling correction prior to at least one of misused word correction and grammar correction.

5. A computer-assisted language correction system according to claim 2 and wherein:
    said input sentence is provided by one of the following functionalities:
        word processor functionality;
        machine translation functionality;
        speech-to-text conversion functionality;
        optical character recognition functionality; and
        instant messaging functionality; and
    said selector is operative to make said selections based on at least one of the following correction functions:
    misused word correction; and
    grammar correction.

6. A computer-assisted language correction system according to claim 1 and wherein said correction generator is operative to provide said correction output based on selections made by said selector without requiring user intervention.

7. A computer-assisted language correction system according to claim 2 and wherein said grammar correction functionality includes at least one of punctuation, verb inflection, single/plural, article and preposition correction functionalities.

8. A computer-assisted language correction system according to claim 2 and wherein said grammar correction functionality includes at least one of replacement, insertion and omission correction functionalities.

9. A computer-assisted language correction system according to claim 1 and wherein said context based scoring functionality is also operative to rank said multiple alternatives based at least partially on normalized CFS frequencies of occurrences in said internet corpus.

10. A computer-assisted language correction system according to claim 1 and wherein said multiple alternatives include alternatives based on adjacent key confusion.

11. A computer-assisted language correction system according to claim 1 and wherein said multiple alternatives include alternatives based on multiple key insertion.

12. A computer-assisted language correction system according to claim 1 and wherein said multiple alternatives include alternatives based on intended pressed key omission.

13. A computer-assisted language correction system according to claim 1 and wherein said multiple alternatives include alternatives based on omission of vowels.

14. A computer-assisted language correction system according to claim 1 and wherein said multiple alternatives include alternatives based on use of phonetic misspellings.

15. A computer-assisted language correction system according to claim 1 and wherein said CFS importance score is also a function of at least one of a CFS length and a CFS type.

* * * * *